US010761740B1

(12) United States Patent
Bradshaw et al.

(10) Patent No.: US 10,761,740 B1
(45) Date of Patent: Sep. 1, 2020

(54) HIERARCHICAL MEMORY WEAR LEVELING EMPLOYING A MAPPED TRANSLATION LAYER

(71) Applicant: Micron Technology, Inc., Boise, ID (US)

(72) Inventors: Samuel E. Bradshaw, Sacramento, CA (US); Justin Eno, El Dorado Hills, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 16/421,353

(22) Filed: May 23, 2019

(51) Int. Cl.
*G06F 3/06* (2006.01)
*G06F 12/02* (2006.01)

(52) U.S. Cl.
CPC ............ *G06F 3/0616* (2013.01); *G06F 3/068* (2013.01); *G06F 3/0647* (2013.01); *G06F 12/0246* (2013.01); *G06F 2212/1036* (2013.01); *G06F 2212/7211* (2013.01)

(58) Field of Classification Search
CPC ...... G06F 3/0616; G06F 3/0647; G06F 3/068; G06F 12/0246; G06F 2212/1036; G06F 2212/7211
See application file for complete search history.

(56) References Cited

U.S. PATENT DOCUMENTS

2018/0046575 A1* 2/2018 Avudaiyappan ...... G06F 9/3834
2020/0105354 A1* 4/2020 Helmick ............. G06F 12/0238

* cited by examiner

*Primary Examiner* — Eric Cardwell
(74) *Attorney, Agent, or Firm* — Nicholson De Vos Webster & Elliott LLP

(57) ABSTRACT

A method for performing wear leveling in a memory subsystem. The method includes adding, in response to a wear-leveling event, a migration association map entry to a migration association map to control copying of a first set of managed units from a first memory segment to a second set of managed units of a second memory segment, wherein adding the migration association map entry includes setting an exchange pointer of the migration association map entry to a value that references an unused managed unit in the first memory segment and copying the first set of managed units to the second set of managed units beginning with a managed unit in the first set of managed units following the managed unit referenced by the exchange pointer of the first segment metadata table entry.

20 Claims, 14 Drawing Sheets

US 10,761,740 B1

HIERARCHICAL MEMORY WEAR LEVELING EMPLOYING A MAPPED TRANSLATION LAYER

TECHNICAL FIELD

The present disclosure generally relates to hierarchical memory wear leveling, and more specifically, relates to hierarchical memory wear leveling that employs a mapped translation layer.

BACKGROUND ART

A memory subsystem can be a storage system, such as a solid-state drive (SSD), or a hard disk drive (HDD). A memory subsystem can be a memory module, such as a dual in-line memory module (DIMM), a small outline DIMM (SO-DIMM), or a non-volatile dual in-line memory module (NVDIMM). A memory subsystem can include one or more memory components that store data. The memory components can be, for example, non-volatile memory components and volatile memory components. In general, a host system can utilize a memory subsystem to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
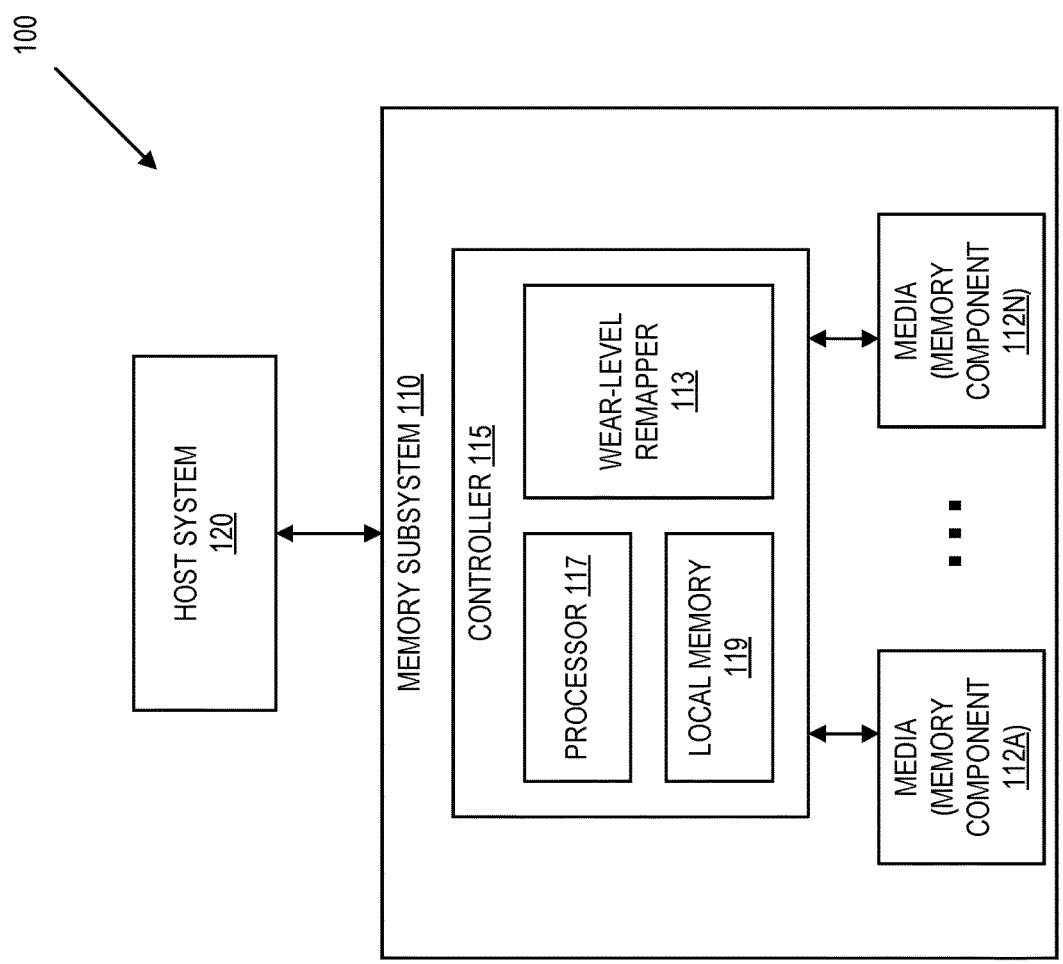
FIG. 1 illustrates an example computing environment that includes a memory subsystem in accordance with some embodiments of the present disclosure.

Aspects of the present disclosure are directed to hierarchical memory wear leveling that employs a mapped translation layer in a memory subsystem. A memory subsystem is also hereinafter referred to as a "memory device." An example of a memory subsystem is a memory module that is connected to a central processing unit (CPU) via a memory bus. Examples of memory modules include a dual in-line memory module (DIMM), a small outline DIMM (SO-DIMM), a non-volatile dual in-line memory module (NVDIMM), etc. Another example of a memory subsystem is a storage device that is connected to the central processing unit (CPU) via a peripheral interconnect (e.g., an input/output bus, a storage area network, etc.). Examples of storage devices include a solid-state drive (SSD), a flash drive, a universal serial bus (USB) flash drive, and a hard disk drive (HDD). In some embodiments, the memory subsystem is a hybrid memory/storage subsystem. In general, a host system can utilize a memory subsystem that includes one or more memory components. The host system can provide data to be stored at the memory subsystem and can request data to be retrieved from the memory subsystem.

Memory components can be logically separated into memory segments, which are themselves comprised of managed units/sectors. For example, a memory component can back ten memory segments (e.g., each memory component can include ten memory segments or the ten memory segments can span a set of memory components) and each memory segment includes 64K or 65,535 managed units, which are each 512 bytes in size. Memory components of a memory subsystem, including non-volatile memory cells, can withstand a fixed number of write and/or read cycles (i.e., a fixed amount of wear) before memory cells of managed units begin to fail and bit error rates begin to be practically unmanageable. Thus, a wear-leveling scheme is employed to maintain a static storage capacity throughout the rated lifetime of any set of memory components. In some cases, swapping of managed units within a single memory segment of a memory component can be utilized for intra-memory segment (sometimes referred to as intra-segment) wear leveling. For example, a memory segment, which maintains a single unused managed unit, can be associated with a swap threshold with a value of ten. In response to ten wear events (e.g., a combination of ten write and/or read operations), the memory subsystem can cause the contents of a used managed unit, which is adjacent to the unused managed unit, to be copied to the unused managed unit. Accordingly, the previously unused managed unit is now being used and the previously used managed unit is now unused. Together with this swap of managed units, the memory subsystem updates metadata to reflect a new logical-to-physical address mapping. Although this intra-segment wear leveling provides some reduction in wear across the memory segment, intra-segment wear leveling does not ensure consistent wear across memory segments. Furthermore, despite additional wear caused by write amplification (e.g., for every ten writes, an additional write is performed for intra-segment wear leveling between used and unused managed units), there is no assurance that in the short-term an intra-segment swap has indeed dealt with a highly used managed unit. Only in the long-term (i.e., after enough intra-segment swaps have occurred such that the unused managed unit has rotated completely through the memory segment) does intra-segment wear leveling consistently deal with a highly used managed unit.

Aspects of the present disclosure deal with the above and other deficiencies by providing a hierarchical set of metadata to perform intra-segment and inter-memory segment (sometimes referred to as inter-segment) wear leveling to ensure consistent wear leveling in memory components. In particular, in addition to a segment metadata table that primarily manages intra-segment swaps and address indirection, a migration association map is introduced for use with inter-segment swaps and corresponding inter-segment wear leveling. The migration association map can include (1) a source memory segment index that represents the source memory segment of a swap; (2) a destination memory segment index that represents the target/destination memory segment of a swap; (3) a starting exchange pointer value that indicates the starting exchange pointer offset of a memory segment swap and thus also indicates the ending exchange pointer offset of a memory segment swap; and (4) an active flag that indicates whether the memory segment swap is ongoing. In some embodiments, entries in the segment metadata table can include a migration index for referencing entries in the migration association map when a corresponding memory segment of a segment metadata table entry is involved in an ongoing inter-segment swap (i.e., either as a source or destination memory segment). As will be described below, this hierarchical relationship between the segment metadata table and the migration association map via the migration index allows the memory subsystem to accommodate address indirection even when an inter-segment swap is active/ongoing such that inter-segment wear leveling can be seamlessly performed without impact to fulfillment of memory requests for a host system.

FIG. 1 illustrates an example computing environment 100 that includes a memory subsystem 110 in accordance with some embodiments of the present disclosure. The memory subsystem 110 can include media, such as memory components 112A to 112N. The memory components 112A to 112N can be volatile memory components, non-volatile memory components, or a combination of such. In some embodiments, the memory subsystem is a storage system. An example of a storage system is an SSD. In some embodiments, the memory subsystem 110 is a hybrid memory/storage subsystem. In general, the computing environment 100 can include a host system 120 that uses the memory subsystem 110. For example, the host system 120 can write data to the memory subsystem 110 and read data from the memory subsystem 110.

The host system 120 can be a computing device such as a desktop computer, laptop computer, network server, mobile device, or such computing device that includes a memory and a processing device. The host system 120 can include or be coupled to the memory subsystem 110 so that the host system 120 can read data from or write data to the memory subsystem 110. The host system 120 can be coupled to the memory subsystem 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory subsystem 110. The host system 120 can further utilize an NVM Express (NVMe) interface to access the memory components 112A to 112N when the memory subsystem 110 is coupled with the host system 120 by the PCIe interface. The physical host interface can provide an interface for passing control, address, data, and other signals between the memory subsystem 110 and the host system 120.

The memory components 112A to 112N can include any combination of the different types of non-volatile memory components and/or volatile memory components. An example of non-volatile memory components includes a negative- and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or another suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory subsystem 110, including handling communications between the memory subsystem 110 and the host system 120. In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the controller 115, in another embodiment of the present disclosure, a memory subsystem 110 may not include a controller 115, and may instead rely upon external control (e.g., provided by an external host, or by a processor or controller separate from the memory subsystem).

In general, the controller 115 can receive commands or operations from the host system 120 and can convert the commands or operations into instructions or appropriate commands to achieve the desired access to the memory components 112A to 112N. The controller 115 can be responsible for other operations such as wear-leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the controller 115 and decode the address to access the memory components 112A to 112N.

The memory subsystem 110 includes a wear-level remapper 113 that can increase the operational life of the memory components 112A to 112N by performing both intra-segment wear leveling and inter-segment wear leveling along with address indirection. In some embodiments, the controller 115 includes at least a portion of the wear-level remapper 113. For example, the controller 115 can include a processor 117 (processing device) configured to execute instructions stored in local memory 119 for performing the operations described herein. In some embodiments, the wear-level remapper 113 is part of the host system 120, an application, or an operating system.

As noted above, the wear-level remapper 113 can perform intra-segment wear leveling and inter-segment wear leveling along with address indirection. Further details with regards to the operations of the wear-level remapper 113 are described below.

Figure 2:
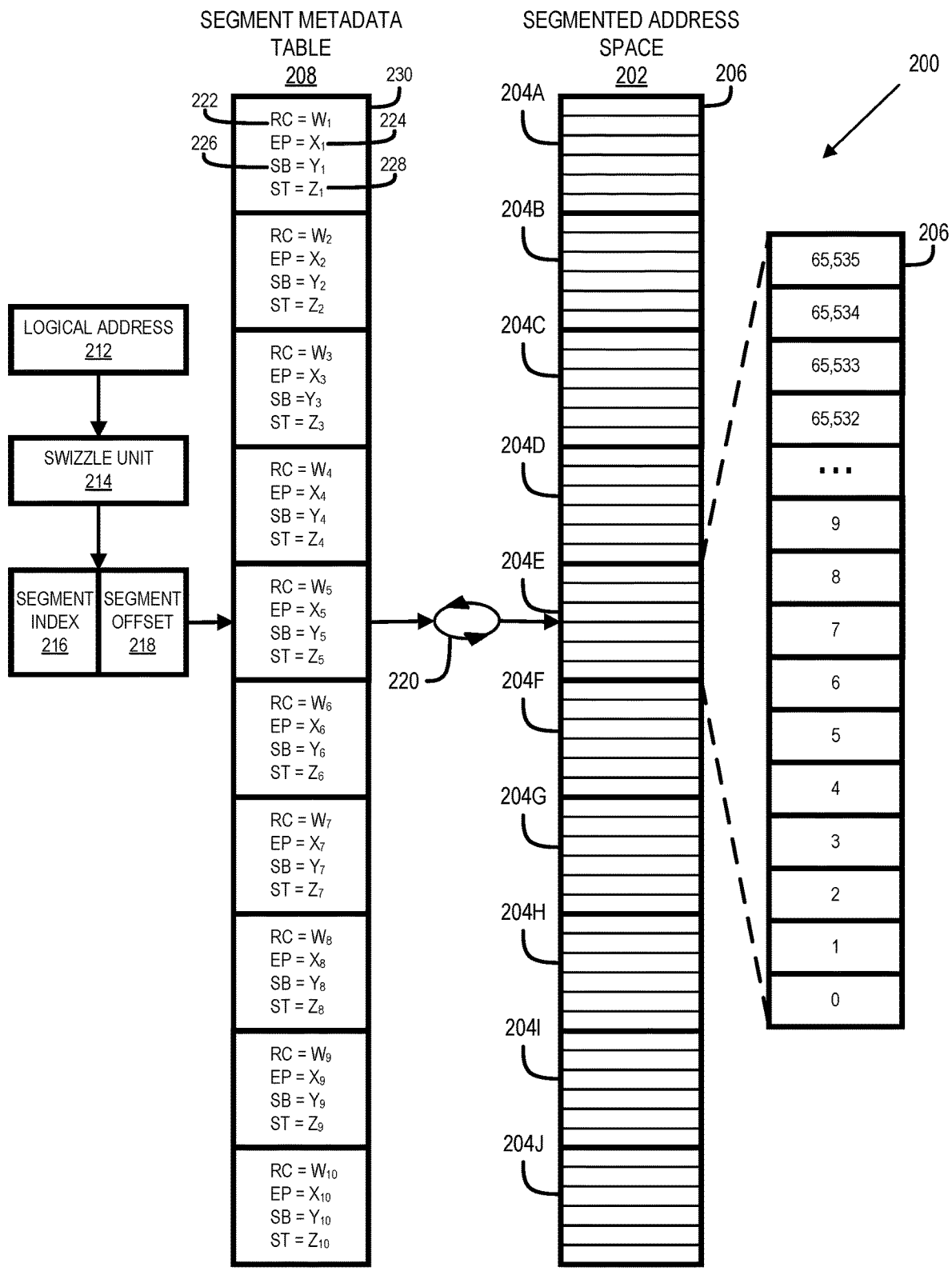
FIG. 2 shows a memory segment translation memory system that can be managed/implemented by a wear-level remapper, according to one example embodiment.

FIG. 2 shows a memory segment translation memory system 200 that can be managed/implemented by the wear-level remapper 113, according to one example embodiment. In particular, the memory system 200 includes a segmented memory address space 202 that is comprised of a set of memory segments 204. In the example shown in FIG. 2, the set of memory segments 204 of the segmented memory address space 202 includes ten memory segments 204A-204J, but the segmented memory address space 202 can include any number of memory segments 204. Each memory segment 204 includes a set of managed units 206 (sometimes referred to as "logical units 206" or "sectors 206"). In one embodiment, each memory segment 204 includes 65,536 managed units 206 and each managed unit 206 is a four-kilobyte piece of user data encoded into a Redundant Array of Independent Disks (RAID) stripe across dice and channels (sometimes referred to as a Redundant Array of Independent X3D (RAIX)) for data integrity. The managed units 206 can each represent an atomic write granularity and each managed unit 206 has a unique managed unit address (MUA) in the segmented memory address space 202 as well as runtime metadata stored in a MUA table (not illustrated). In the embodiment described above in which each memory segment 204 includes 65,535 managed units 206, 65,534 managed units 206 are used to actively store user data for a host system 120, while a single managed unit 206 in each memory segment 204 is designated as a spare/unused managed unit 206, which can be used for intra-segment data swapping and corresponding intra-segment wear leveling, as will be described in greater detail below. The example division and size of the segmented address space 202 described above in the memory system 200 excludes any media overhead for ECC, CRC, spare bits, or other per-block metadata, which can also be present. In other embodiments, different numbers of managed units 206 can be used (e.g., each memory segment 204 includes 64,001 managed units 206 and 64,000 managed units 206 are used to actively store user data for a host system 120, while a single managed unit 206 in each memory segment 204 is designated as a spare/unused managed unit 206). Accordingly, the example of 65,535 managed units 206 is used for purposes of illustration.

In one embodiment, the functionality described in relation to and shown in FIG. 2 is performed partly or entirely by the wear-level remapper 113. Accordingly, the intra-segment wear leveling and address redirection described in relation to FIG. 2 is performed by the wear-level remapper 113 of the memory subsystem 110. Thus, the segmented address space 202, the memory segments 204, and corresponding managed units 206 are part of the memory components 112A to 112N.

As will be described in greater detail below, in addition to fulfilling memory requests from host systems 120, the memory segment translation memory system 200 can perform an algorithmic indirection scheme to memory segments 204 to wear level amongst the managed units 206 within memory segments 204. In particular, the algorithmic indirection scheme can utilize a segment metadata table 208, which stores information for both (1) fulfilling a memory request from a host system 120 and (2) supporting wear leveling amongst the managed units 206 within memory segments 204. As shown in FIG. 2, each entry 230 in the segment metadata table 208 (sometimes referred to as a segment metadata table entry 230) can include a rotation count (RC) 222, an exchange pointer (EP) 224, a segment base (SB) 226, and/or a swap threshold (ST) 228. Each of these pieces of metadata will be described below in greater detail.

Each memory segment 204 has a base physical address that anchors this memory segment 204 to a range of sequential physical addresses/managed units 206 in the segmented address space 202 and each entry 230 in the segment metadata table 208 can reference a separate memory segment 204 by setting a segment base 226 of the entry 230 to the base address of the memory segment 204. Although the base address of a memory segment 204 is static for the life of the memory segment 204 (e.g., the memory segment 204A is statically associated with the base address "0," the memory segment 204B is statically associated with the base address "1," etc.), the segment base 226 for each entry 230 in the segment metadata table 208 can be adjusted such that a particular entry 230 in the segment metadata table 208 can be modified to reference any memory segment 204 in the segmented address space 202 to enable intra-segment wear leveling and address indirection, as will be described in greater detail below.

Beyond the segment base 226, the rotation count 222 and/or the exchange pointer 224 of each entry 230 can be used to define indirection between logical addresses 212 received in a memory request from a host system 120 and physical addresses of managed units 206 in memory segments 204. In particular, as will be described in greater detail below, upon receiving a memory request from a host system 120 (e.g., a read or write request), which includes a logical address 212, a swizzle unit 214 processes the logical address 212 to reveal a segment index 216 and a segment offset 218. In particular, the swizzle unit 214 performs an algorithmic one-to-one mapping of a logical address 212 to corresponding segment index 216 and segment offset 218. Upon locating an entry 230 in the segment metadata table 208 based on the segment index 216 of a logical address 212, an indirection function 220 can generate an address of a managed unit 206 within the memory segment 204 referenced by the segment base 226 of the located entry 230 based on the segment offset 218 along with the rotation count 222 and the exchange pointer 224 from the located entry 230.

Figure 3:
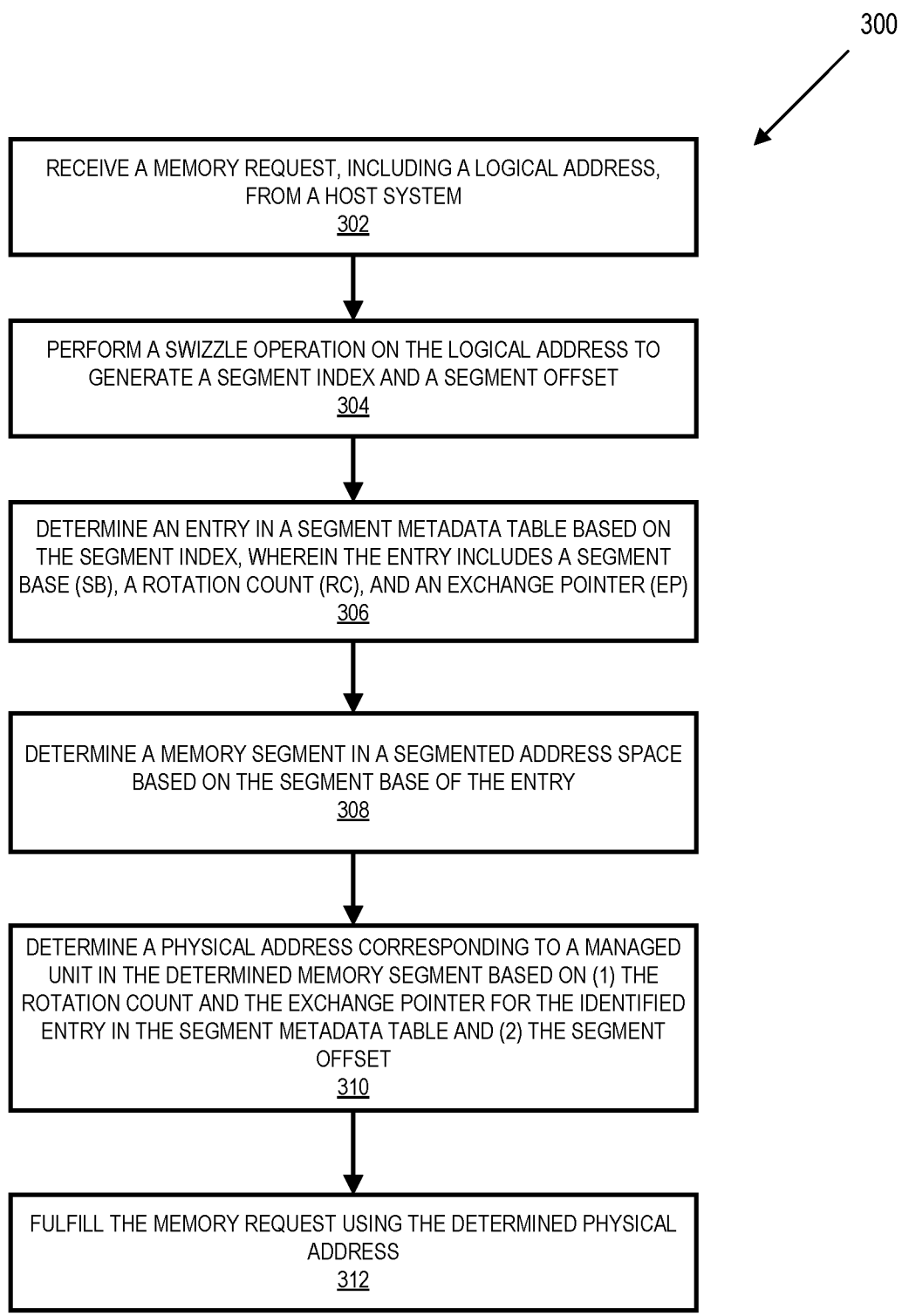
FIG. 3 shows a method for translating a logical address to a physical address of a managed unit in a segmented memory address space, in accordance with some embodiments of the present disclosure.

For example, FIG. 3 shows a method 300 for translating a logical address 212 to a physical address of a managed unit 206 in the segmented memory address space 202, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the wear-level remapper 113 of FIG. 1, including one or more elements of the memory segment translation memory system 200. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 302, the processing device receives a memory request from a host system 120. The received memory request includes a logical address 212 and is used for accessing/referencing a managed unit 206 of a memory segment 204 in the segmented address space 202. For example, the memory request can be a read memory request, which requests data from a managed unit 206 of a memory segment 204 corresponding to the logical address 212, or the memory request can be a write memory request, which requests the writing of data (also provided in the memory request) to a managed unit 206 of a memory segment 204 corresponding to the logical address 212.

At operation 304, the processing device performs a swizzle operation on the logical address 212 of the received memory request to generate a segment index 216 and a segment offset 218 corresponding to the logical address 212. In particular, the swizzle unit 214 can perform a one-to-one mapping operation that uses bit manipulation or other functions to produce the segment index 216 and the segment offset 218 in response to the logical address 212. Accordingly, for each logical address 212, the swizzle operation of the swizzle unit 214 generates a single segment index 216 and segment offset 218 set. As will be described in greater detail below, the processing device uses the segment index 216 to identify an entry 230 in the segment metadata table 208, which identifies a memory segment 204 based on the segment base 226 of the located entry 230. Thereafter, the processing device uses the segment offset 218 to identify a managed unit 206 within the identified memory segment 204.

At operation 306, the processing device determines an entry 230 in the segment metadata table 208 based on the segment index 216. For instance, each entry 230 in the segment metadata table 208 is associated with a value for the segment index 216. For example, the first entry 230 in the metadata table 208 can correspond to a segment index 216 with the value of one, the second entry 230 in the metadata table 208 can correspond to a segment index 216 with the value of two, the third entry 230 in the metadata table 208 can correspond to a segment index 216 with the value of three, etc. Accordingly, in response to a segment index 216 with a value of two, the processing device determines/identifies the second entry 230 in the metadata table 208 at operation 306. As discussed above, each entry 230 includes a segment base 226 whose value the processing device will use to identify a memory segment 204 in the segmented address space 202, and a rotation count 222 and an exchange pointer 224, which the processing device will use for identifying a managed unit 206 in the identified memory segment 204, as will be discussed below.

At operation 308, the processing device determines a memory segment 204 in the segmented address space 202 based on the segment base 226 of the determined/identified entry 230. In particular, as noted above, each of the entries 230 includes a segment base 226 and the value of each segment base 226 is associated with a memory segment 204 in the segmented address space 202. For example, the first entry 230 in the metadata table 208 corresponds to a segment base 226 with the value of $Y_1$, the second entry 230 in the metadata table 208 corresponds to a segment base 226 with the value of $Y_2$, the third entry 230 in the metadata table 208 corresponds to a segment base 226 with the value of $Y_3$, etc. In the example above when the processing device determines/identifies the second entry 230 at operation 306, the processing device determines/identifies a memory segment 204 in the segmented address space 202 based on the value $Y_2$ of the segment base 226 for this entry 230. For purposes of illustration, when the value $Y_2$ is five, this value for the segment base 226 corresponds to the fifth memory segment 204 in the segmented address space 202, which is the memory segment 204E. Accordingly, in this example, the processing device determines/identifies the memory segment 204E at operation 308.

At operation 310, the processing device determines a physical address corresponding to a managed unit 206 in the identified memory segment 204 based on (1) the rotation count 222 and the exchange pointer 224 for the identified entry 230 and (2) the segment offset 218 that the processing device determined based on the logical address 212. As discussed above, each of the entries 230 of the segment metadata table 208 include a rotation count 222 and an exchange pointer 224. The exchange pointer 224 references a spare/unused managed unit 206 within the memory segment 204 (i.e., no logical address maps to this managed unit 206). As will be discussed below, the unused managed unit 206 becomes used (i.e., mapped) when an intra-segment exchange operation occurs with a used managed unit 206. The exchange pointer 224 is sized to index the full physical range of the memory segment 204 (i.e., the exchange pointer 224 can reference each managed unit 206 in a corresponding memory segment 204). For instance, when each managed unit includes 65,534+1 managed units 206 (where the additional managed unit 206 corresponds to the addition of an unused/spare managed unit 206), seventeen bits are used for the exchange pointer 224 to capture the index scope.

The rotation count 222 tracks how many times the spare/unused managed unit 206 has migrated/rotated through every possible location/managed unit 206 in the memory segment 204 and how many wraps have occurred. In particular, as will be described below, to perform intra-segment wear leveling, one or more swap operations are performed between used managed units 206 and the empty/unused managed unit 206 such that the empty/unused managed unit 206 shifts/rotates through the memory segment 204. The rotation count 222 is sized (i.e., the number of bits that is used to represent values of the rotation count 222) based on the endurance capabilities of the media in which the memory segments 204 are located and acts as a proxy for the degree of wear experienced by the memory segments 204.

In one embodiment, the processing device uses the indirection function 220 to determine the physical address of the managed unit 206 (i.e., a managed unit address) corresponding to the logical address 212 at operation 310. For example, the indirection function 220 can use Equations 1 and 2 below to determine the physical address (PhysicalAddress) of the managed unit 206 based on the segment offset 218 (SegmentOffset), the rotation count 222 (RotationCount), the number of managed units 206 in the memory segment 204 (N), and the exchange pointer 224 (ExchangePointer).

PhysicalAddress=(SegmentOffset+RotationCount) modulus N  Equation 1 if (PhysicalAddress≥ExchangePointer) then
PhycialAddress=Physical Address+1  Equation 2

Figure 4:
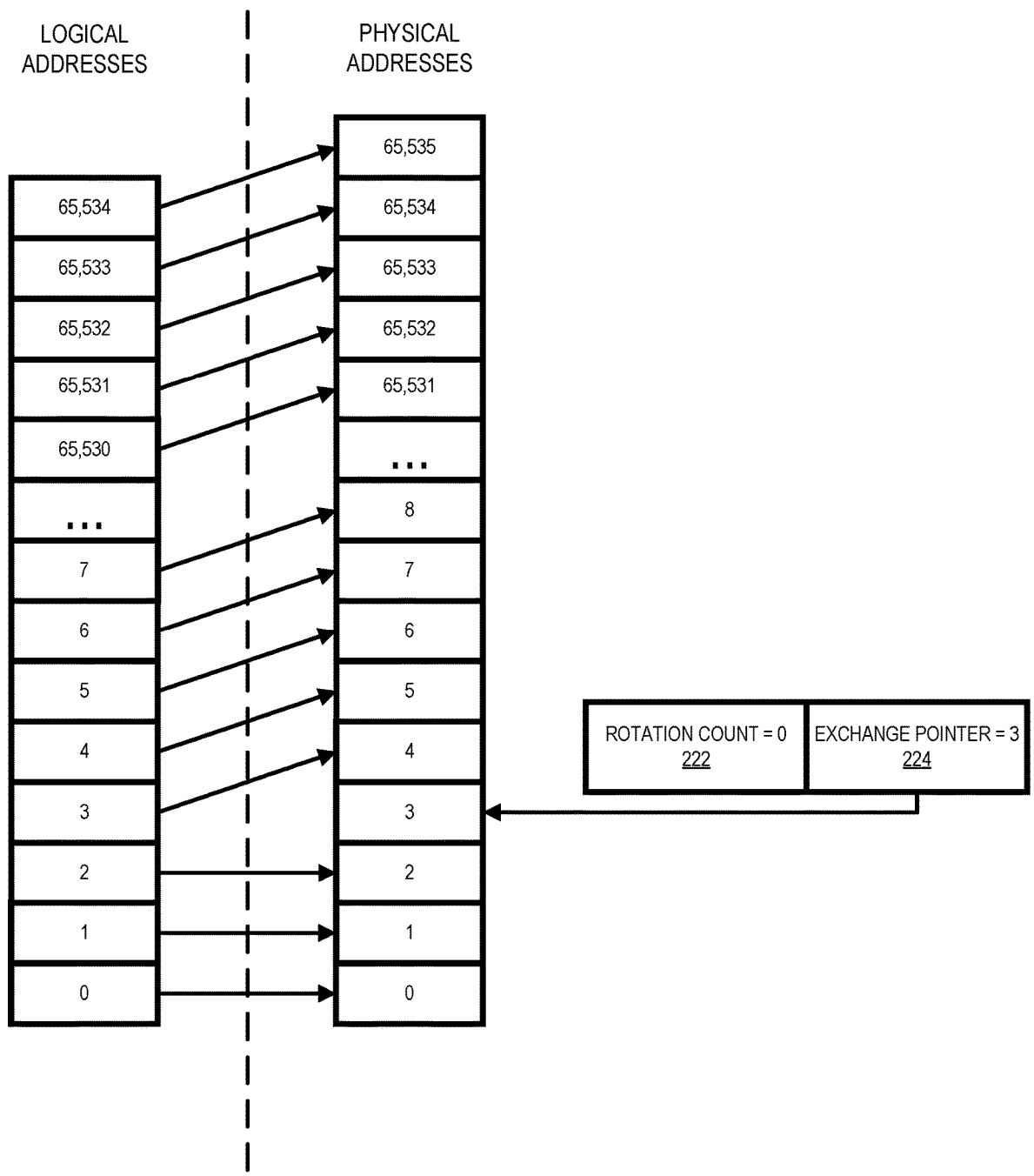
FIG. 4 shows an example of mapping logical addresses to physical addresses of managed units within a memory segment, in accordance with some embodiments of the present disclosure.

FIG. 4 shows an example of mapping logical addresses (i.e., the segment offset 218 of a logical address 212) to physical addresses of managed units 206 within a memory segment 204. In this example, the logical addresses are on the left, the physical addresses are on the right, and the arrows denote the mapping of logical to physical addresses when the rotation count 222 is zero and the exchange pointer 224 is three.

Figure 5:
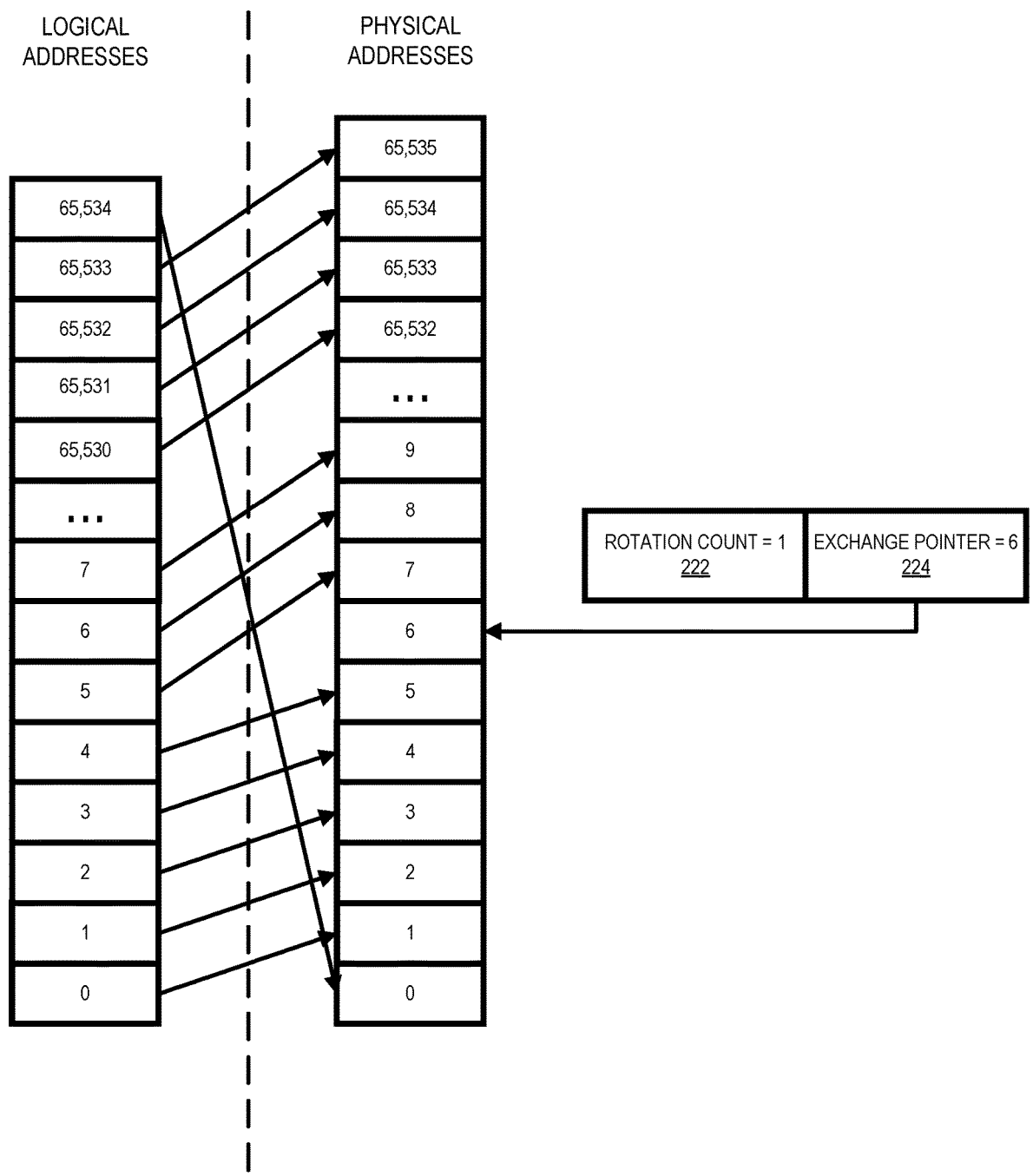
FIG. 5 shows another example of mapping logical addresses to physical addresses of managed units within a memory segment, in accordance with some embodiments of the present disclosure.

FIG. 5 shows another example of mapping logical addresses to physical addresses of managed units 206 within a memory segment 204. Again, the logical addresses are on the left, the physical addresses are on the right, but the arrows denote the mapping of logical to physical addresses when the rotation count 222 is one and the exchange pointer 224 is six.

At operation 312, the processing device fulfills the memory request based on the determined physical address of the managed unit 206 (i.e., a managed unit address) corresponding to the logical address 212. For example, when the memory request was a read memory request, the processing device returns data in the managed unit 206 at the determined physical address to the host system 120 at operation 312. When the memory request is a write memory request, the processing device writes data from the write memory request to the managed unit 206 at the determined physical address at operation 312.

Figure 6:
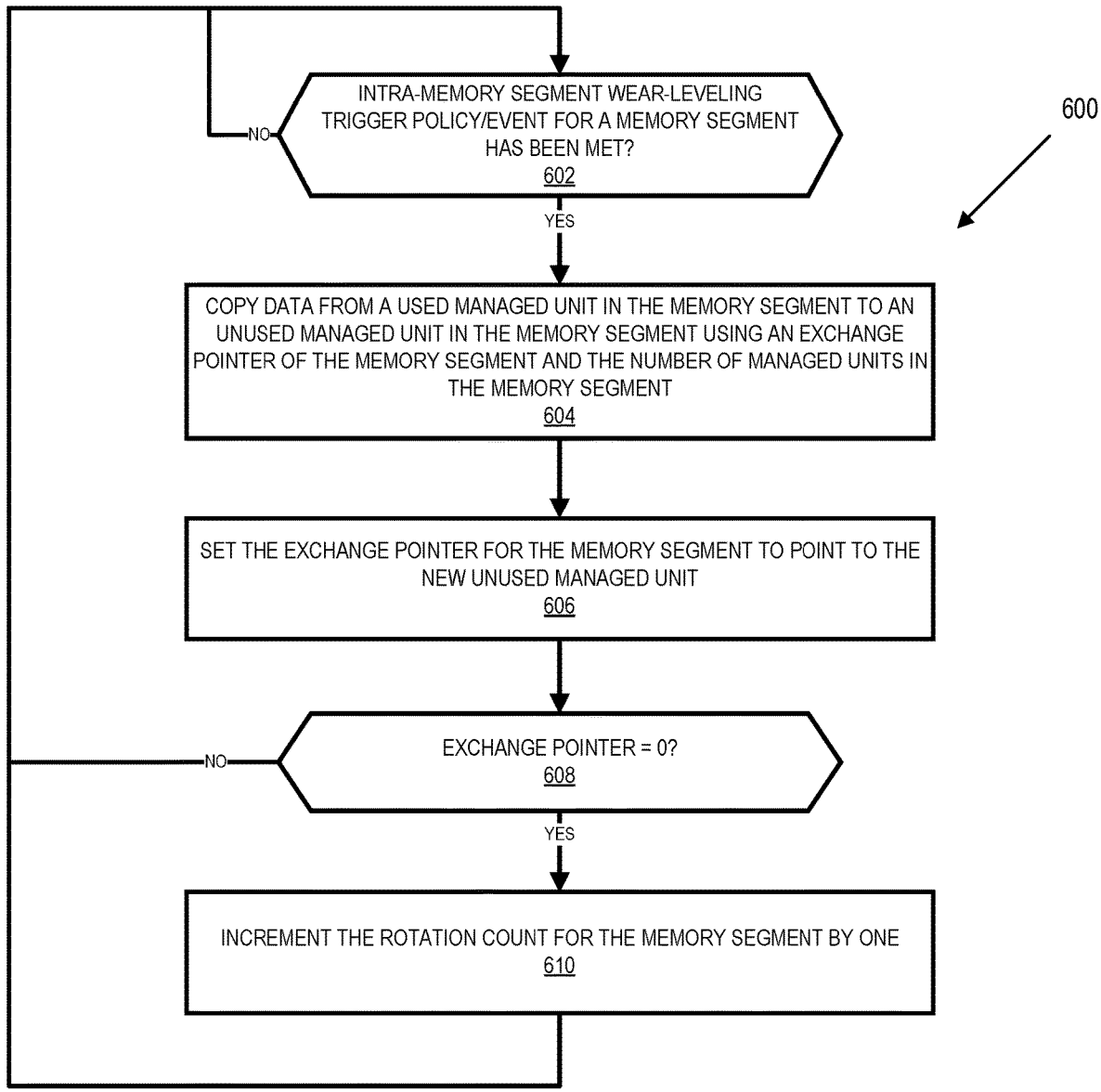
FIG. 6 shows a method for performing intra-memory segment swapping/rotation of managed units for wear leveling across the memory segment, in accordance with some embodiments of the present disclosure.

Turning now to FIG. 6 a method 600 is described for performing intra-segment swapping/rotation of managed units 206 for wear leveling across the memory segment 204, in accordance with some embodiments of the present disclosure. As will be described, the wear leveling within a memory segment 204 of the method 600 is affected by deterministic, sequential rotation of mappings between logical addresses 212 and physical addresses of managed units 206. In particular, an exchange pointer 224, a rotation count 222, and a trigger are inputs to the method 600 to implement the indirection. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the wear-level remapper 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 602, the processing device determines if an intra-segment wear-leveling trigger policy/event has been met or has otherwise been detected for a memory segment 204. An intra-segment wear-leveling trigger policy/event can be a function of any number of inputs, including (1) writes and/or reads to the memory segment 204; (2) writes and/or reads to cells adjacent to cells in the memory segment 204 (i.e., writes and/or reads to adjacent managed units 206 within a memory segment 204); (3) spatial locality of accesses within the memory segment 204; (4) available but unused read/write bandwidth in the processing device; (5) elapse of a time period (i.e., periodic time-based triggering); and/or (6) random time-delta triggering. For example, each entry 230 in the segment metadata table 208 includes a swap threshold 228. The swap threshold 228 can indicate the number of wear events (e.g., write and/or read operations) that are to occur before an intra-segment swap is to be performed between managed units 206 of the memory segment 204. When the processing device determines at operation 602 that the intra-segment wear-leveling trigger policy/event has not been met (e.g., the swap threshold 228 for a memory segment 204 has not been reached), the method 600 returns to operation 602 until the intra-segment wear-leveling trigger policy/event has been met. Conversely, when the processing device determines at operation 602 that the intra-segment wear-leveling trigger policy/event has been met, the method 600 moves to operation 604.

At operation 604, the processing device uses the exchange pointer 224 for the memory segment 204 for which the intra-segment wear-leveling trigger policy/event was met and the number of managed units 206 in the memory segment 204 (i.e., N) to copy data from one managed unit 206 in the memory segment 204 to another managed unit 206 in the memory segment 204 (i.e., copy data from a used managed unit 206 to the unused managed unit 206 in the memory segment 204). In particular, the processing device copies data from the used managed unit 206 corresponding to (ExchangePointer+1) modulus N to the unused managed unit 206 referenced by the exchange pointer 224. Thus, the previously used managed unit 206 becomes unused and the previously unused managed unit 206 is now in use.

At operation 606, the processing device sets the exchange pointer 224 for the memory segment 204. In one embodiment, the processing device sets the exchange pointer 224 based on Equation 3 below such that the exchange pointer 224 points to the newly unused managed unit 206 while accounting for full rotation through all managed units 206 in a memory segment 204.

$$\text{ExcahngePointer}=(\text{ExchangePointer}+1) \text{modulus}(N+1) \quad \text{Equation 3}$$

At operation 608, the processing device determines if the exchange pointer 224 for the memory segment 204 is equal to zero (i.e., the exchange pointer 224 has completed a rotation through the managed units 206 in the memory segment 204). In response to the processing device determining that the exchange pointer 224 for the memory segment 204 is equal to zero, the method 600 moves to operation 610.

At operation 610, the processing device increments the rotation count 222 by one (i.e., RotationCount=RotationCount+1). This increment of the rotation count 222 indicates that the exchange pointer 224 has completed a full rotation through the managed units 206 in the memory segment 204. Accordingly, future indirection of logical addresses can be correctly accounted for based on this increment of the rotation count 222.

Returning to operation 608, in response to the processing device determining that the exchange pointer 224 for the memory segment 204 is not equal to zero or following operation 610, the method 600 moves back to operation 602.

As described above, swapping of managed units 206 within a single memory segment 204 can be utilized for intra-segment wear leveling. However, inter-segment wear leveling can be used in addition to intra-segment wear leveling to ensure consistent wear leveling in the memory components 112A-112N. For example, workload skew of users can be represented in wear levels across media. In particular, a user primarily utilizing a particular application, which is allocated a particular region of the memory components 112A-112N, can result in more wear to this region of the memory components 112A-112N in comparison to another region of the memory components 112A-112N that is allocated to a rarely utilized application. The intra-segment wear-leveling schemes outlined above will even this wear across managed units 206 in the memory segment 204 to potentially lengthen the life of the memory components 112A-112N. However, workload and consequent wear-skew could manifest as asymmetric accesses to memory segments 204 regardless of how the physical media is carved up into those memory segments 204. Thus, wear-skew can accumulate across memory segments 204. Accordingly, a wear-leveling scheme is presented to modulate that inter-segment skew.

Figure 7:
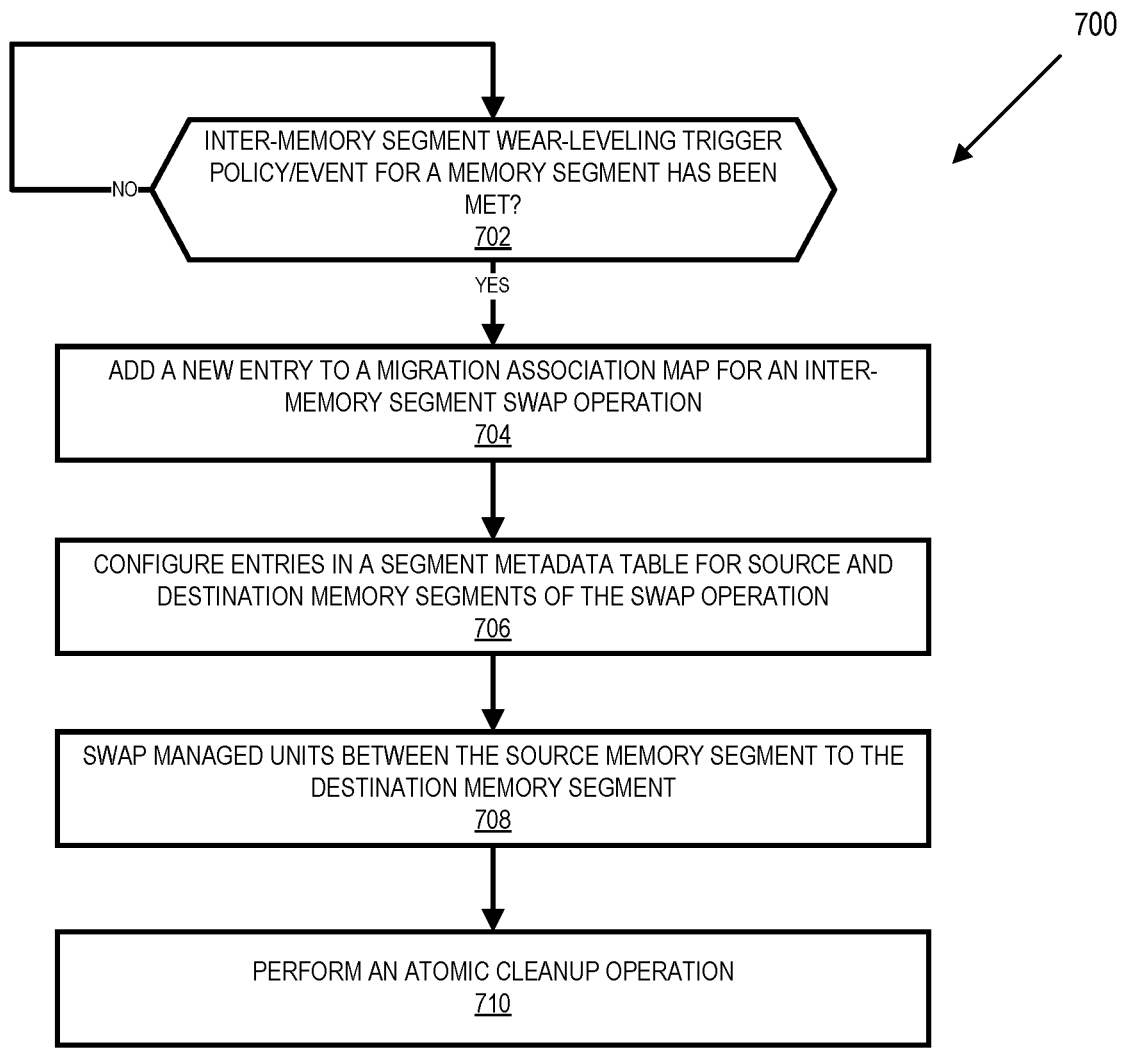
FIG. 7 shows a method for performing inter-memory segment swapping of managed units for wear leveling across memory segments, in accordance with some embodiments of the present disclosure.

Turning now to FIG. 7, a method 700 is presented for performing inter-segment rotation/swapping of managed units 206 for wear leveling across memory segments 204 (i.e., inter-segment wear leveling), in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the wear-level remapper 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 702, the processing device determines if an inter-segment wear-leveling trigger policy/event has been met or otherwise been detected. In one embodiment, memory segment 204 wear metrics can be derived from data in the segment metadata table 208 that can be used for defining inter-segment wear-leveling trigger policies/events. For example, in one embodiment, the rotation count 222 for a memory segment 204 can represent a wear level of the memory segment 204. In particular, each time the rotation count 222 for a memory segment 204 increments by one, the unused managed unit 206 has circulated/migrated throughout the memory segment 204, resulting in a number of managed unit 206 swaps in the memory segment 204 equal to the number of managed units 206 in the memory segment 204 (each requiring a managed unit 206 read and write operation in the memory segment 204). To determine a wear level for a memory segment 204 based on write operations, the processing device can multiply the rotation count 222 of the memory segment 204 by the swap threshold 228 for the memory segment 204. If all memory segments 204 have the same swap threshold 228, the rotation count 222 can act directly as a proxy for wear. Memory segments 204 with high rotation counts 222 are candidates for inter-memory segment wear leveling or retirement. If the rotation count 222 is used to track wear, the rotation count 222 is never decremented or cleared. As such, any spare memory segments 204, if present, still maintain a rotation count 222.

The processing device can compare/examine the memory segment 204 wear-level metrics described above or other memory segment 204 wear-level metrics to determine wear-skew across memory segments 204 (i.e., an inter-memory segment wear-leveling trigger policy/event has been met) at operation 702. For example, wear-skew is detected across a set of memory segments 204 and the processing device determines that an inter-memory segment wear-leveling trigger policy/event has been met when a wear-level metric for a memory segment 204 reaches one standard deviation away from the average of all memory segments 204. As another example, the processing device determines that an inter-memory segment wear-leveling trigger event has been met when a wear-level metric of one memory segment 204 rises above a wear-level metric of another memory segment 204. In this example embodiment, the memory segments 204 with the highest and lowest wear-level metrics can be swapped, either directly or indirectly through a spare memory segment 204 as will be described in greater detail below. Memory segment 204 swaps are used to associate historically heavily-used logical address ranges with less worn physical addresses.

Figure 8:
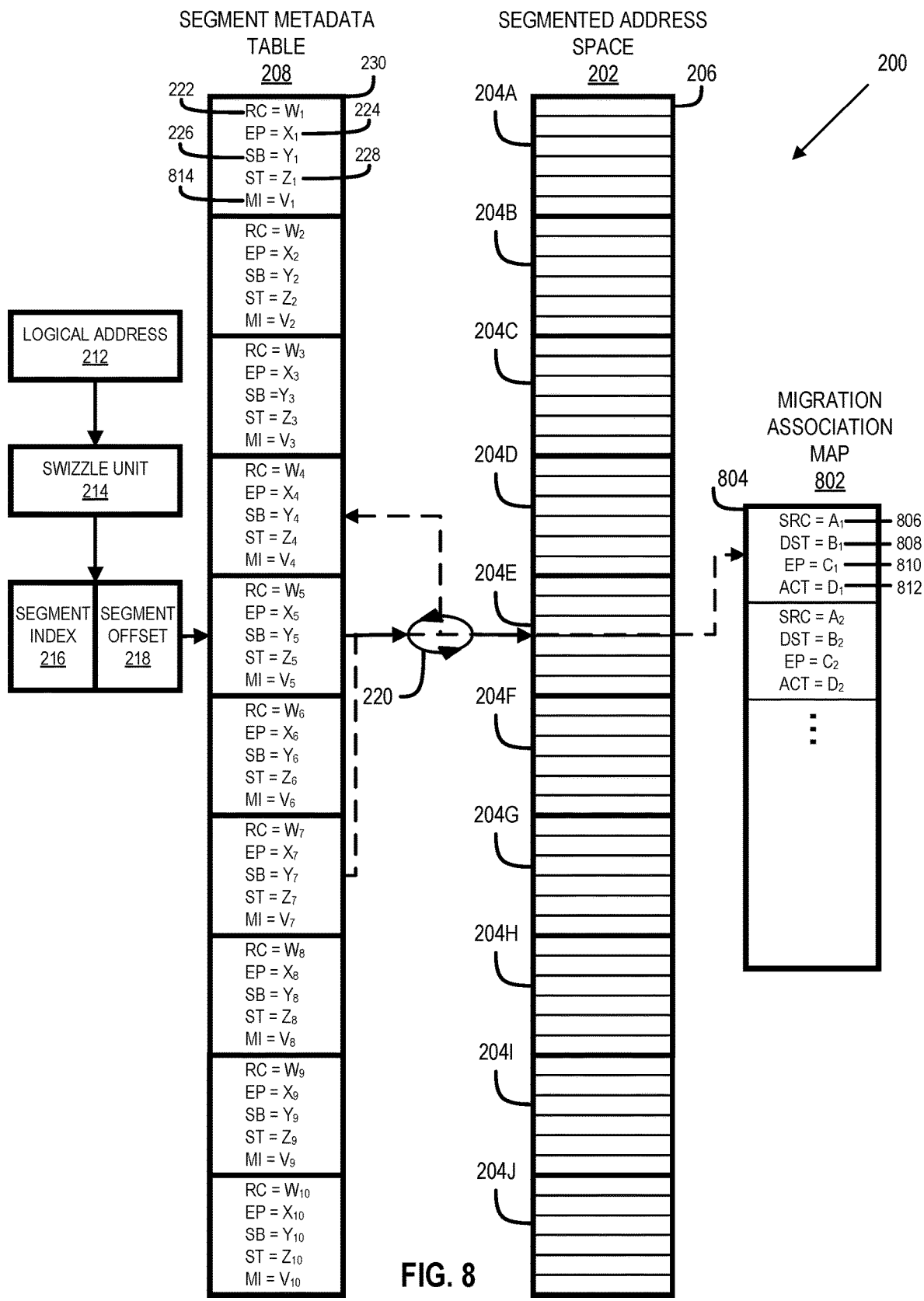
FIG. 8 shows the linkage of memory segments through a migration association map with a set of migration association map entries, in accordance with one example embodiment.

The memory segment 204 swap mechanism described herein adds new requirements to the address translation flow. To deal with these new requirements, the memory segment 204 swap mechanism can utilize a migration association map, which acts as an additional source of metadata. As will be described in greater detail below, the migration association map is used to associate and track memory segments 204 undergoing swap operations. FIG. 8 shows the linkage of memory segments 204 through a migration association map 802 with a set of migration association map entries 804 in the memory system 200, in accordance with one example embodiment. Each entry 804 in the migration association map 802 contains metadata corresponding to an inter-segment swap operation, including one or more of (1) a source memory segment index ("SRC") 806 that represents the source memory segment 204 of a swap; (2) a destination memory segment index ("DST") 808 that represents the target/destination memory segment 204 of a swap operation; (3) a starting exchange pointer value ("EP") 810, which indicates the starting exchange pointer 224 offset of a memory segment 204 swap and thus also indicates the ending exchange pointer 224 offset of a memory segment 204 swap, since the memory segments 204 are of fixed size; and (4) an active flag ("ACT") 812, which indicates whether the memory segment 204 swap operation is ongoing (e.g., the active flag 812 is set to one to indicate that the swap operation is ongoing and is otherwise set to zero). In some embodiments, the active flag 812 is stored in the segment metadata table 208 instead of the migration association map 802.

In addition to the migration association map 802, a migration index ("MI") 814 is added to the segment metadata table 208. The migration index 814 references entries 804 in the migration association map 802, which enables address translation to identify the source memory segment 806 and the target/destination memory segment 808 of a memory segment 204 swap operation. Accordingly, the migration index 814 represents an offset within the migration association map 802 to an entry 804 that contains metadata describing the memory segment 204 swap operation.

In some embodiments, the memory segment 204 swap operation uses one or more spare/unused memory segments 204. These spare memory segments 204 are unmapped to user transactions and become targets/destinations for a memory segment 204 swap operation. The spare memory segments 204 can be identified as such either within the segment metadata table 208, another table, or are located at predefined offsets in the segment metadata table 208 (e.g., the last three entries 230 in the segment metadata table 208 are devoted to referencing spare memory segments 204). Although spare memory segments 204 can be employed for memory segment 204 swaps, in some embodiments, swapping is performed between a highly worn memory segment 204 and with a less worn memory segment 204, both of which contain live user data. For purposes of illustration, the method 700 will be described in relation to the use of a spare memory segment 204. In particular, the memory segment 204J will be considered a spare memory segment 204 for purposes of illustration.

At operation 704, the processing device adds a new migration association map entry 804 to the migration association map 802 to commence the start of an inter-memory segment swap operation. Adding the new entry 804 includes setting a value for the exchange pointer 810 to the value of the exchange pointer 224 for the source memory segment 204 that is stored in the corresponding entry 230 of the segment metadata table 208. This value of the exchange pointer 224 for the source memory segment 204 can be used to know when to end the swap operation (i.e., memory segments 204 are of a fixed size and swapping corresponding managed units 206 ends when the exchange pointer 224 for the source memory segment 204 wraps back to the starting value that is captured in the exchange pointer 810 of the entry 804 in the migration association map 802). In some embodiments, the exchange pointer 810 of the entry 804 is instead stored in the segment metadata table 208 or another table separate from the migration association map 802 as this value can also be used in address translation. Adding the new entry 804 at operation 704 also includes setting the source memory segment index 806 and the destination memory segment index 808 to the segment bases 226 of the corresponding entries 230 in the segment metadata table 208. Furthermore, adding the new entry 804 also includes setting the active flag 812 to indicate that the swap identified by the entry 804 is active (e.g., the active flag 812 is set to one to indicate that the swap operation is ongoing/active).

At operation 706, the processing device configures entries 230 in the segment metadata table 208 for both the source and destination memory segments 204. In one embodiment, this configuration includes the processing device setting the migration index 814 for entries 230 of both the source and destination memory segments 204 to reference the new entry 804 in the migration association map 802 added at operation 704. In some embodiments, this configuration further includes the processing device setting the swap threshold 228 for the source memory segment 204 per policy. For example, the swap threshold 228 for an entry 230 of the source memory segment 204 can be set to indicate that an exchange operation is triggered on every access to the memory segment 204 (e.g., set to the value "1").

Figure 9:
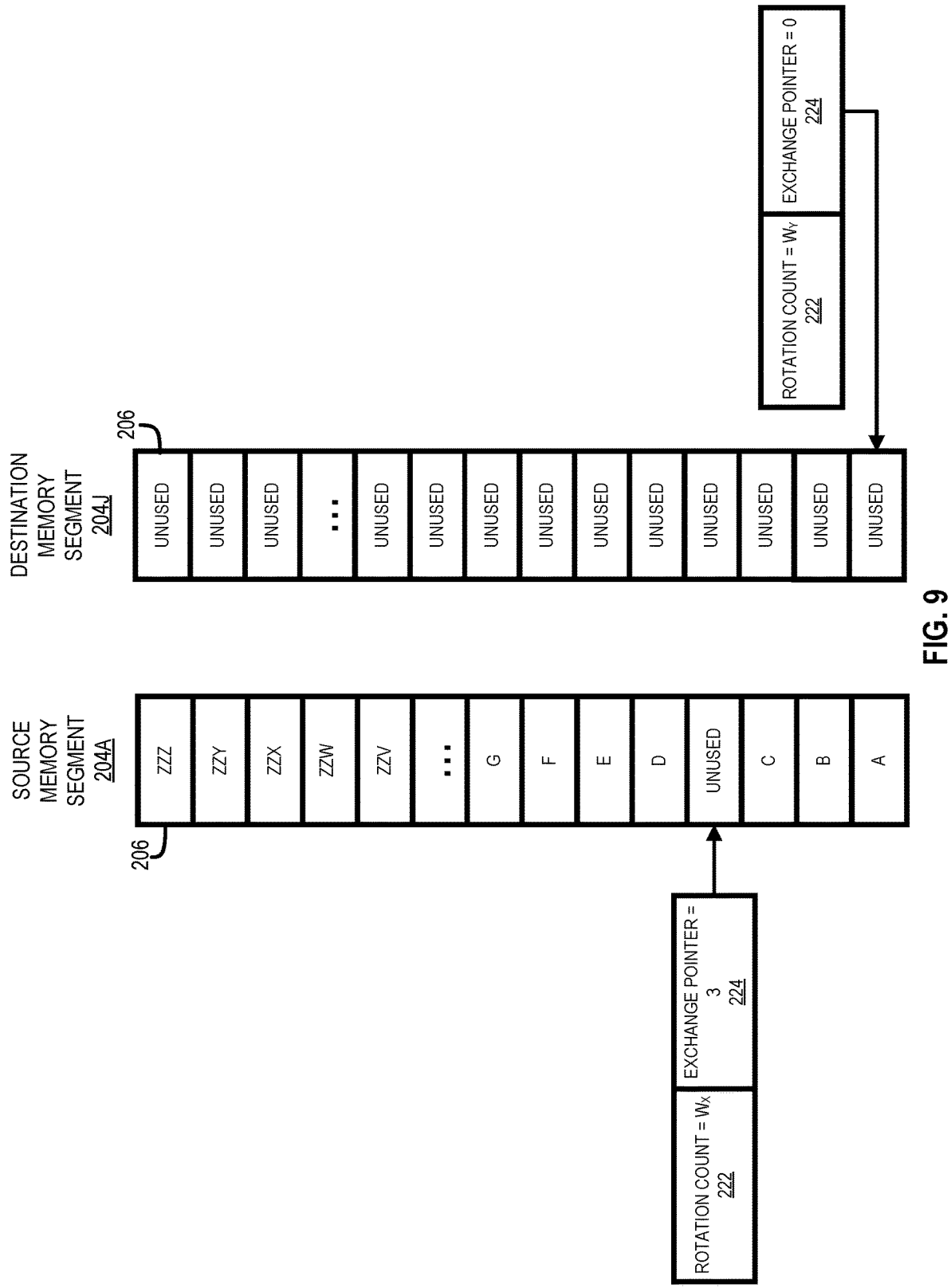
FIG. 9 shows a pre-swap state of the source memory segment and the destination memory segment, in accordance with some embodiments of the present disclosure.
Figure 10:
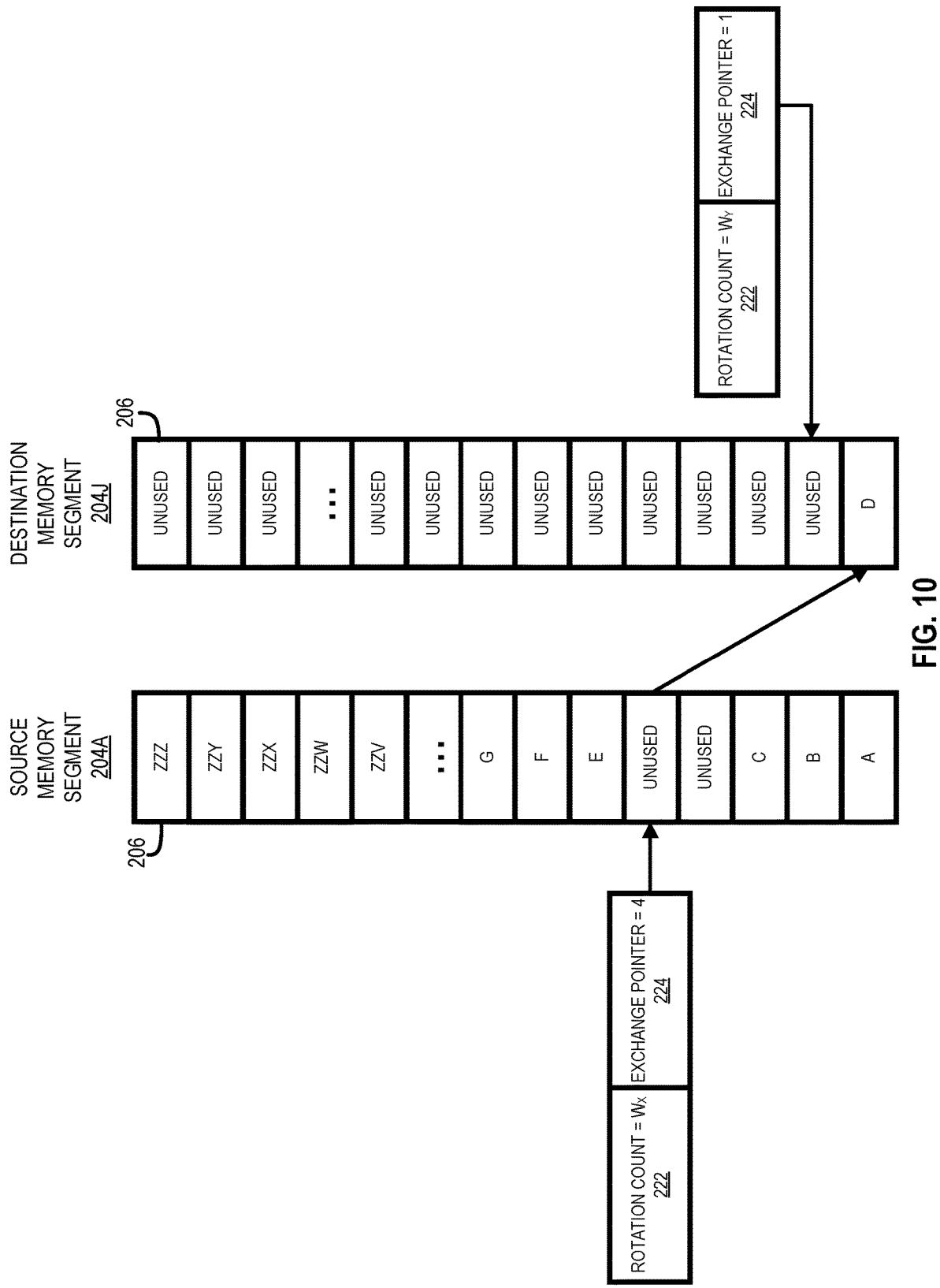
FIG. 10 shows a state of the source memory segment and the destination memory segment after a single managed unit swap, in accordance with some embodiments of the present disclosure.
Figure 11:
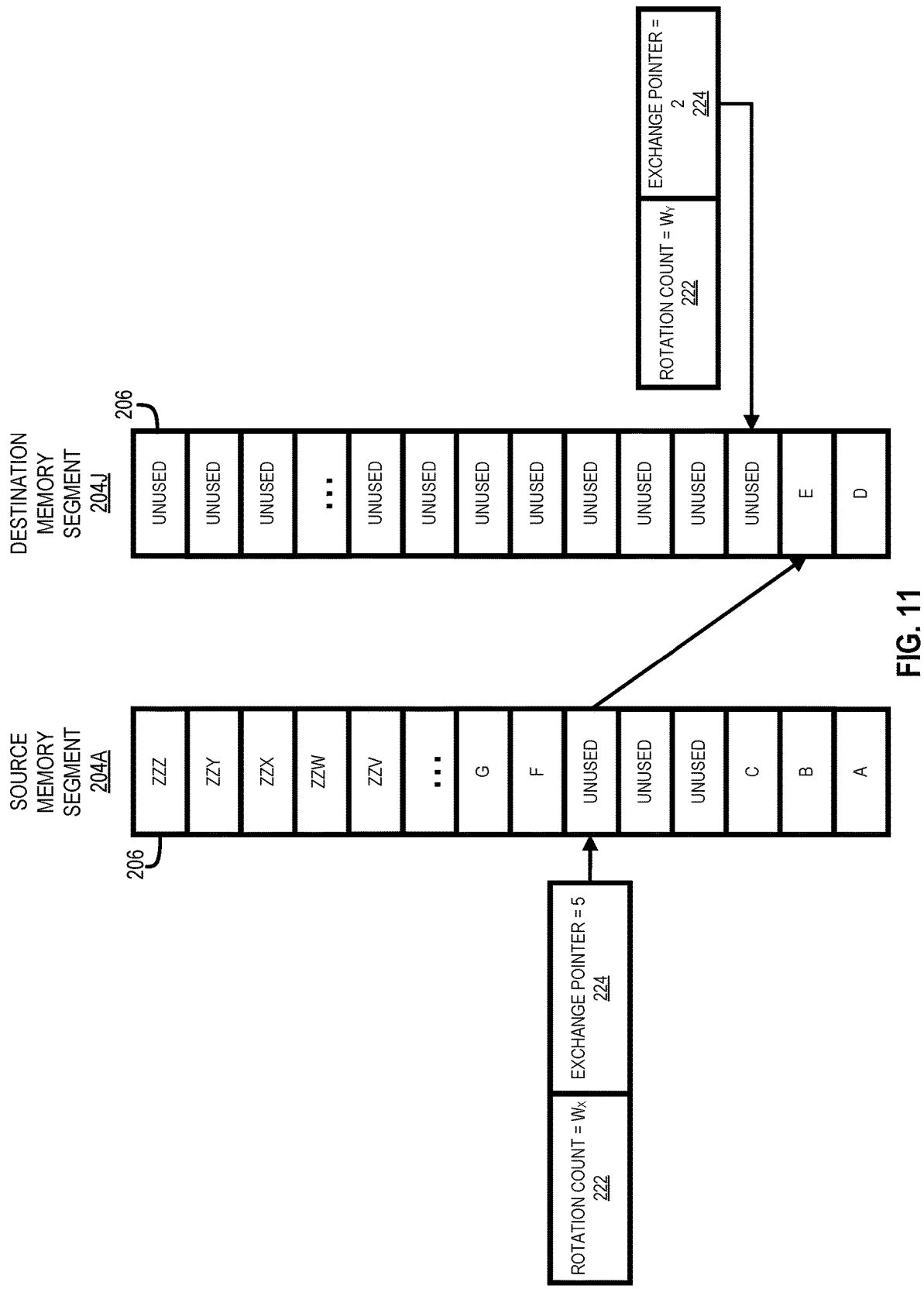
FIG. 11 shows a state of the source memory segment and the destination memory segment after another (a second) managed unit swap, in accordance with some embodiments of the present disclosure.

At operation 708, the processing device swaps managed units 206 from the source memory segment 204 to the managed units 206 in the destination memory segment 204. FIG. 9 shows a pre-swap state of the source memory segment 204A and the destination memory segment 204J, in accordance with one example embodiment. The rotation counts 222 are abstracted as $W_X$ and $W_Y$, respectively, and the exchange pointers 224 reflect example starting offsets for these memory segments 204. FIG. 10 shows a state of the source memory segment 204A and the destination memory segment 204J after a single managed unit 206 swap. As shown, the processing device copies the managed unit 206 following/above the managed unit 206 referenced by the exchange pointer 224 of the source memory segment 204A (i.e., exchange pointer 224+1) to the managed unit 206 referenced by the exchange pointer 224 of the destination memory segment 204, which was previously unused. Thereafter, the processing device increments the exchange pointer 224 of the source memory segment 204A by one to reference the previously copied managed unit 206 and the processing device also increments the exchange pointer 224 of the destination memory segment 204J by one to point to a new unused managed unit 206. FIG. 11 shows a state of the source memory segment 204A and the destination memory segment 204J after another (a second) managed unit 206 swap. Similar to the first swap operation, the processing device copies the managed unit 206 following/above the managed unit 206 referenced by the exchange pointer 224 of the source memory segment 204A (i.e., exchange pointer 224+1) to the managed unit 206 referenced by the exchange pointer 224 of the destination memory segment 204J, which was previously unused. Thereafter, the processing device increments the exchange pointer 224 of the source memory segment 204A by one to reference the previously copied managed unit 206 and the processing device increments the exchange pointer 224 of the destination memory segment 204J by one to point to a new unused managed unit 206.

Figure 12:
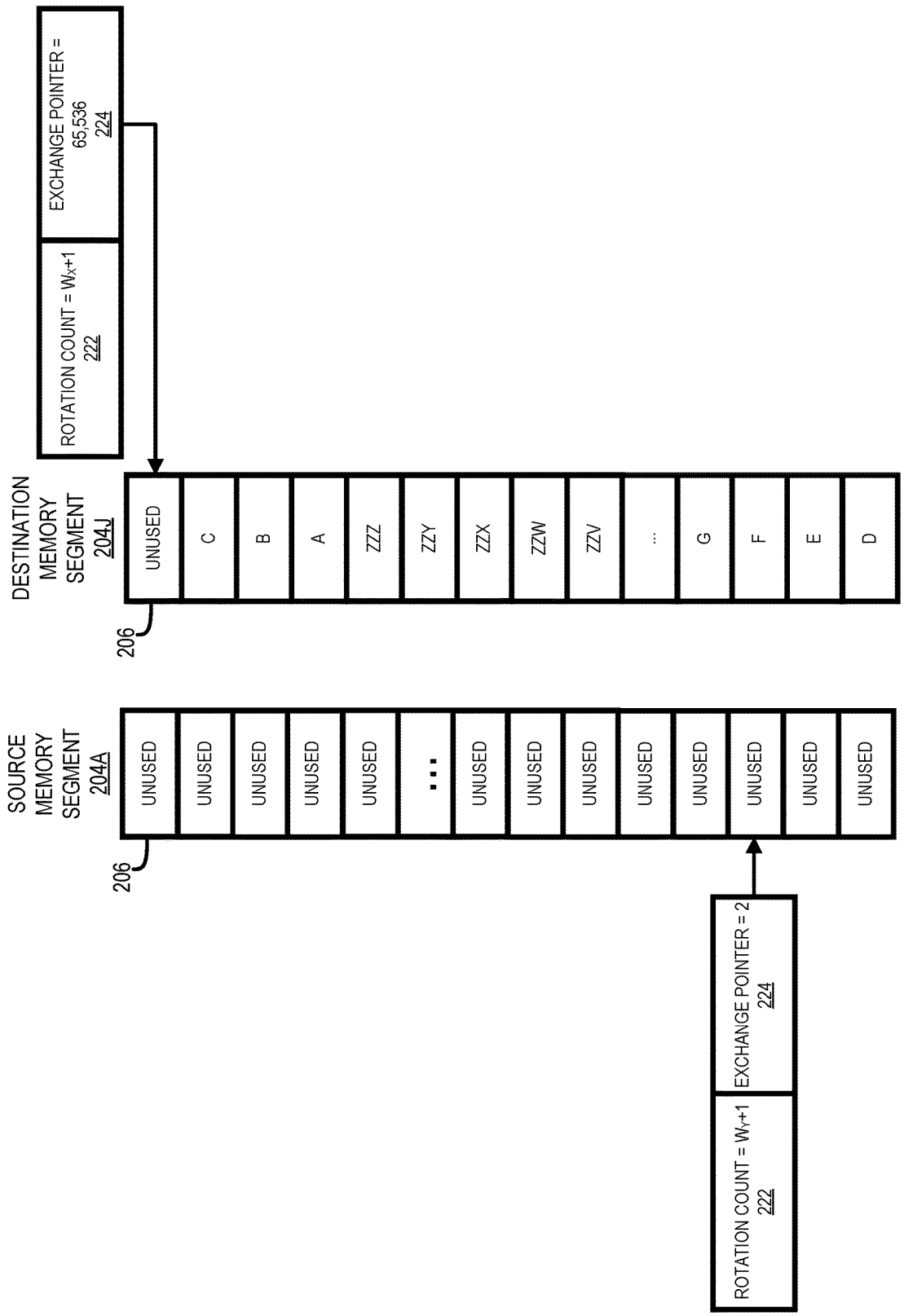
FIG. 12 shows the state of the source memory segments and the destination memory segment after swaps of all the managed units have been made, in accordance with some embodiments of the present disclosure.

FIG. 12 shows the state of the source memory segments 204A and the destination memory segment 204J after swaps of all the managed units 206 have been made (i.e., after the exchanger pointer 810 of the entry 804 equals the exchange pointer 224+1 of the entry 230). As shown, the exchange pointer 224 of the source memory segment 204A and the destination memory segments 204J are one less than their originating values. Furthermore, the rotation count 222 for the source memory segment 204A was incremented by one to account for the moving the exchange pointer 224 through each of the managed units 206.

At operation 710, the processing device performs an atomic cleanup operation following the swap operations between the source memory segment 204A and the destination memory segment 204J. In particular, the cleanup operation includes clearing the entry 804 in the migration association map 802 associated with the source and destination memory segments 204A and 204J by either deleting this entry 804 or setting the active flag 812 for the entry 804 to inactive (e.g., setting the active flag 812 to the value zero). In some embodiments, the cleanup operation can also include the processing device (1) swapping the rotation count 222, the exchange pointer 224, and/or the segment base 226 between entries 230 of the source and destination memory segments 204A and 204J, (2) clearing the migration index 814 for both entries 230, (3) resetting the swap threshold 228 per policy, and (4) setting the source memory segment 204A as a spare/unused memory segment 204.

As described above, inter-memory segment rotation of managed units 206 can be performed using a set of data structures, including the segment metadata table 208 and the migration association map 802. In some embodiments, a memory request can be received by the memory subsystem 110 while an inter-segment swap is taking place. Accordingly, since the inter-segment swap is presently taking place, the target managed unit 206 of the memory request could be in the source memory segment 204A or in the destination memory-segment 204J. In this case, the method 300 of FIG. 3 is modified to account for this ambiguity as described below.

Figure 13:
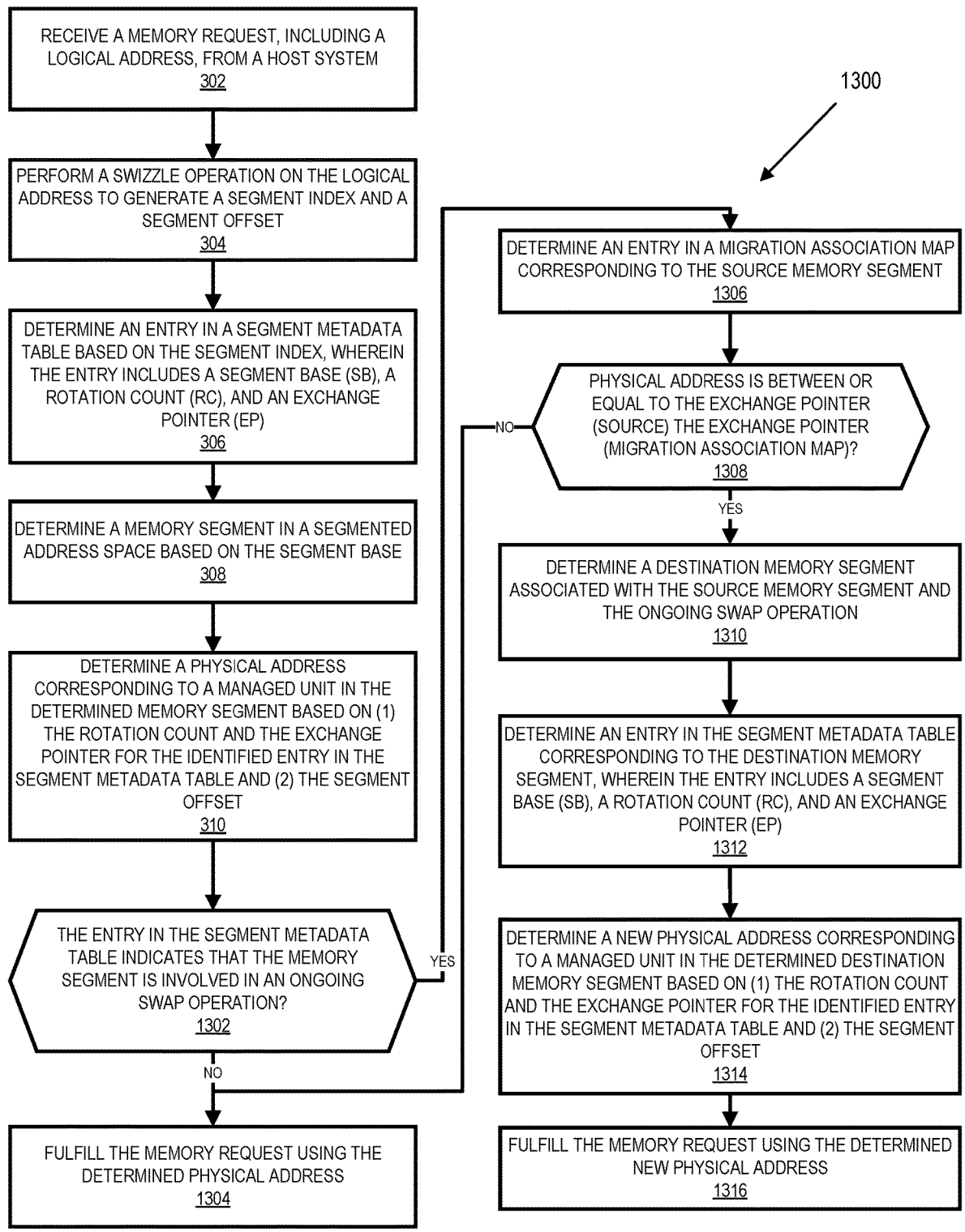
FIG. 13 shows a method for translating a logical address to a physical address of a managed unit in a segmented memory address space, in accordance with some embodiments of the present disclosure.

FIG. 13 shows a method 1300 for translating a logical address 212 to a physical address of a managed unit 206 in the segmented memory address space 202, in accordance with some embodiments of the present disclosure. In particular, the method 1300 accounts for an ongoing inter-segment rotation of managed units 206. The method 1300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1300 is performed by the wear-level remapper 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 13, the method 1300 includes the operations 302-310 from the method 300 shown in FIG. 3. The processing device performs these operations 302-310 in an identical or similar manner as that discussed above in relation to the method 300.

Following the processing device generating a physical address of a managed unit 206 of a memory segment 204 at operation 310, the processing device determines at operation 1302 if the corresponding entry 230 in the segment metadata table 208 indicates that the memory segment 204 is involved in an ongoing inter-segment swap operation. For example, when the entry 230 in the segment metadata table 208 includes a migration index 814 that does not reference an entry 804 in the migration association map 802, the processing device determines at operation 1302 that the memory segment 204 associated with the entry 230 in the segment metadata table 208 is not involved in an ongoing inter-segment swap operation. After this determination that the memory segment 204 associated with the entry 230 in the segment metadata table 208 is not involved in an ongoing inter-segment swap operation, the method 1300 moves to operation 1304.

At operation 1304, which is similar to operation 310, the processing device fulfills the received memory request based on the physical address of the managed unit 206 (i.e., a managed unit address) corresponding to the logical address 212 that was determined at operation 310. For example, when the memory request was a read memory request, the processing device returns data in the managed unit 206 at the determined physical address to the host system 120 at operation 1304. When the memory request is a write memory request, the processing device writes data from the write memory request to the managed unit 206 at the determined physical address at operation 1304.

Returning to operation 1302, when the processing device determines that the memory segment 204 associated with the entry 230 in the segment metadata table 208 is involved in an ongoing inter-memory segment swap operation, the method 1300 moves to operation 1306. At operation 1306, the processing device determines an entry 804 in the migration association map 802 corresponding to the source memory segment 204 (e.g., the memory segment 204A, which will be used for purposes of illustration). For example, in one embodiment, the migration index 814 of the entry 230 in the segment metadata table 208 corresponding to the source memory segment 204A references an entry 804 in the migration association map 802 associated with the ongoing inter-segment swap operation. Accordingly, the processing device determines an entry 804 in the migration association map 802 corresponding to the memory segment 204A at operation 1306 by analyzing the migration index 814 of the entry 230 in the segment metadata table 208 corresponding to the source memory segment 204A.

At operation 1308, the processing device determines if the physical address (i.e., the physical offset into a memory segment 204), which was determined at operation 310, is between (inclusive) the current value of the exchange pointer 224 of the source memory segment 204A (as indicated by the corresponding entry 230 in the segment metadata table 208) and the exchange pointer 810 of the entry 804 in the migration association map 802 corresponding to the source memory segment 204A (i.e., the entry 804 that manages or is otherwise associated with the ongoing inter-memory segment swap operation involving the source memory segment 204A), which corresponds to the value of the exchange pointer 224 of the source memory segment 204A at the start of the ongoing inter-segment swap operation involving the source memory segment 204A. A physical address "between" exchange pointers accounts for wrap around. For instance, if the exchange pointer 224 of the source memory segment 204A is greater than the exchange pointer 810 of the entry 804, an offset/physical address that is less than or equal the exchange pointer 224 of the source memory segment 204A but greater than or equal the exchange pointer 810 of the entry 804 is considered between exchange pointers 224/810. However, if the exchange pointer 224 of the source memory segment 204A has wrapped, the exchange pointer 224 will be less than the exchange pointer 810 of the entry 804. In which case, an offset/physical address that is greater than or equal the exchange pointer 810 of the entry 804 or less than or equal to the number of managed units 206 in a memory segment 204 (e.g., less than 65,535) but less than or equal the exchange pointer 224 of the source memory segment 204A is considered between exchange pointers 224/810. For example, referring again to FIG. 9, when the current value for source exchange pointer 224 reaches address 1, which stores the data labeled "B," the address 0 (illustrated as storing data labeled "A") will be between the current value of the exchange pointer 224 of the source memory segment 204A and the exchange pointer 810 in the migration association map 802 (the starting position of "exchange pointer=3" as illustrated in FIG. 9). When the processing device determines that the physical address is between (inclusive) the current value of the exchange pointer 224 of the source memory segment 204A and the exchange pointer 810 of the entry 804 in the migration association map 802 corresponding to the source memory segment 204A, the method 1300 moves to operation 1310.

At operation 1310, the processing device determines a destination memory segment 204 (e.g., the memory segment 204J, which will be used for purposes of illustration) associated with the source memory segment 204A and the ongoing inter-segment swap operation. For example, the entry 804 in the migration association map 802 determined/identified at operation 1306 includes a destination memory segment index ("DST") 808 that references the destination memory segment 204J corresponding to the ongoing inter-segment swap operation. Accordingly, the processing device can determine the destination memory segment 204J associated with the source memory segment 204A and the ongoing inter-segment swap operation at operation 1310 by examining the destination memory segment index ("DST") 808 of the entry 804 in the migration association map 802 determined/identified at operation 1306.

At operation 1312, the processing device determines an entry 230 in the segment metadata table 208 corresponding to the destination memory segment 204J. In particular, the destination memory segment index ("DST") 808 of the entry 804 in the migration association map 802 determined/identified at operation 1310 indexes the segment metadata table 208 and can be used by the processing device at operation 1312 to determine/identify an entry 230 in the segment metadata table 208 corresponding to the destination memory segment 204J.

At operation 1314, the processing device determines a new physical address corresponding to a managed unit 206 in the identified destination memory segment 204J based on (1) the rotation count 222 and the exchange pointer 224 for the identified entry 230 of the destination memory segment 204J and (2) the segment offset 218 that was determined based on the logical address 212.

At operation 1316, which is similar to operation 310 and operation 1304, the processing device fulfills the received memory request based on the determined new physical address of a managed unit 206 (i.e., a managed unit address) corresponding to the logical address 212. For example, when the memory request was a read memory request, the processing device returns data in the managed unit 206 at the determined new physical address to the host system 120 at operation 1316. When the memory request is a write memory request, the processing device writes data from the write memory request to the managed unit 206 at the determined new physical address at operation 1304.

Returning to operation 1308, when the processing device determines that the physical address is not between (inclusive) the current value of the exchange pointer 224 of the source memory segment 204A and the exchange pointer 810 of the entry 804 in the migration association map 802 corresponding to the source memory segment 204A (i.e., the managed unit 206 has not yet been copied/swapped to the destination memory segment 204J), the method 1300 moves to operation 1304 for the processing device to fulfill the memory request based on the originally determined physical address from operation 310 (i.e., a physical address of a managed unit 206 in the source memory segment 204A).

Figure 14:
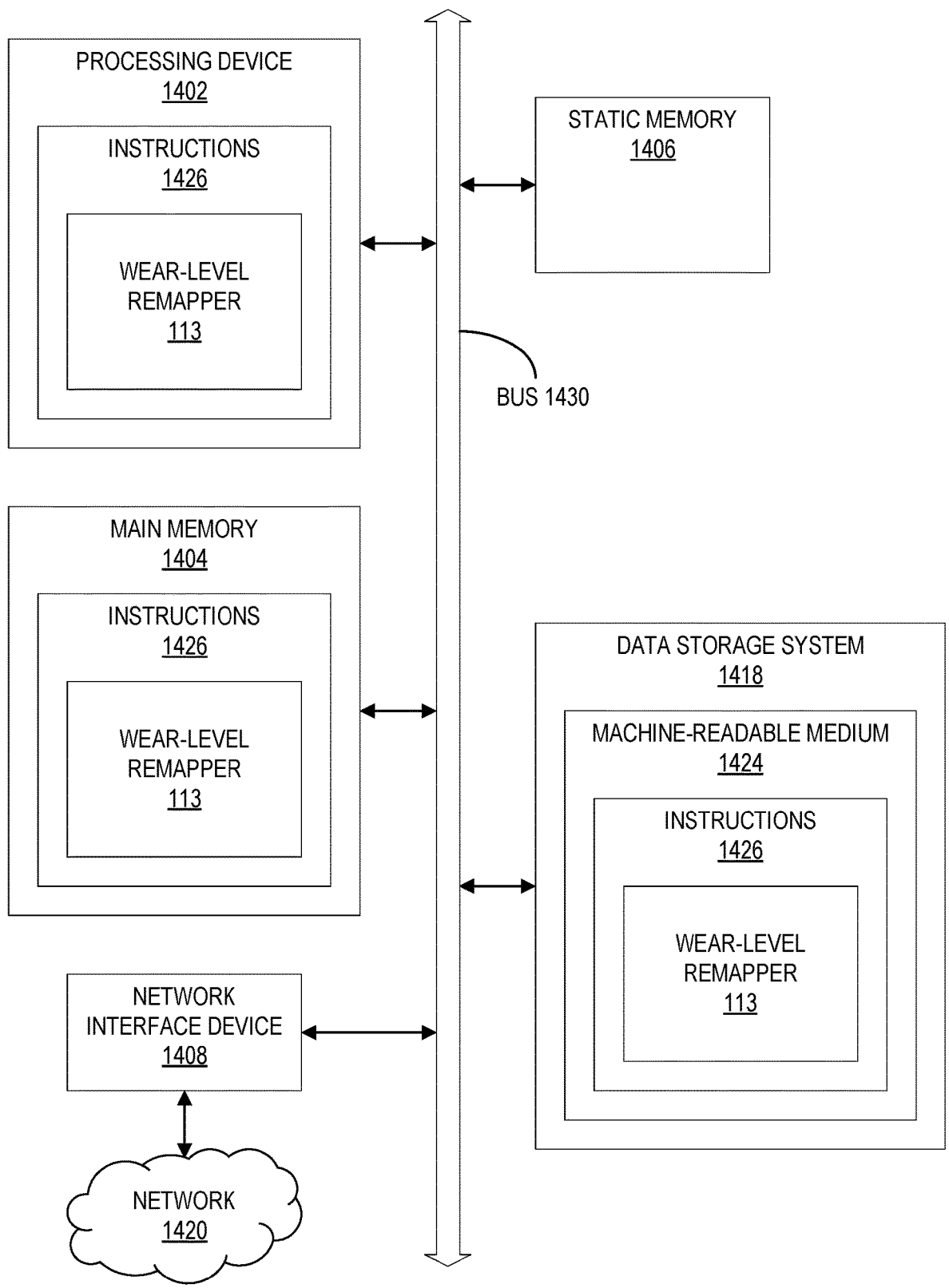
FIG. 14 is a block diagram of an example computer system in which embodiments of the present disclosure may operate.

FIG. 14 illustrates an example machine of a computer system 1400 within which a set of instructions, for causing the machine to perform any one or more of the methodologies discussed herein, can be executed. In some embodiments, the computer system 1400 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the wear-level remapper 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Furthermore, while a single machine is illustrated, the term "machine" shall also be taken to include any collection of machines that individually or jointly execute a set (or multiple sets) of instructions to perform any one or more of the methodologies discussed herein.

The example computer system 1400 includes a processing device 1402, a main memory 1404 (e.g., read-only memory (ROM), flash memory, dynamic random access memory (DRAM) such as synchronous DRAM (SDRAM) or Rambus DRAM (RDRAM), etc.), a static memory 1406 (e.g., flash memory, static random access memory (SRAM), etc.), and a data storage system 1418, which communicate with each other via a bus 1430.

Processing device 1402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1402 can also be one or more special-purpose processing devices such as an application specific integrated circuit (ASIC), a field programmable gate array (FPGA), a digital signal processor (DSP), network processor, or the like. The processing device 1402 is configured to execute instructions 1426 for performing the operations and steps discussed herein. The computer system 1400 can further include a network interface device 1408 to communicate over the network 1420.

The data storage system 1418 can include a machine-readable storage medium 1424 (also known as a computer-readable medium) on which is stored one or more sets of instructions 1426 or software embodying any one or more of the methodologies or functions described herein. The instructions 1426 can also reside, completely or at least partially, within the main memory 1404 and/or within the processing device 1402 during execution thereof by the computer system 1400, the main memory 1404 and the processing device 1402 also constituting machine-readable storage media. The machine-readable storage medium 1424, data storage system 1418, and/or main memory 1404 can correspond to the memory subsystem 110 of FIG. 1.

In one embodiment, the instructions 1426 include instructions to implement functionality corresponding to a wear-level remapper (e.g., the wear-level remapper 113 of FIG. 1). While the machine-readable storage medium 1424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. For example, a computer system or other data processing system, such as the controller 115 and/or the wear-level remapper 113, may carry out the computer-implemented methods 300, 600, 700, and 1300 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method for performing wear leveling in a memory subsystem, the method comprising:
   detecting a wear-leveling event in relation to a first memory segment in a set of memory components of the memory subsystem;
   adding, in response to detection of the wear-leveling event, a migration association map entry to a migration association map to control copying of a first set of managed units from the first memory segment to a second set of managed units of a second memory segment in the set of memory components, wherein adding the migration association map entry includes setting a source address of the migration association map entry to an address of the first memory segment, setting a destination address of the migration association map entry to an address of the second memory segment, and an exchange pointer of the migration association map entry to a value that references an unused managed unit in the first memory segment when the wear-leveling event is detected, wherein the value is retrieved from an exchange pointer of a first segment metadata table entry in a segment metadata table associated with the first memory segment; and copying the first set of managed units from the first memory segment to the second set of managed units of the second memory segment beginning with a managed unit in the first set of managed units following the managed unit referenced by the exchange pointer of the first segment metadata table entry, wherein copying each managed unit in the first set of managed units to the second set of managed units includes incrementing the exchange pointer of the first segment metadata table entry such that the exchange pointer of the first segment metadata table entry references an immediately, previously copied managed unit in the first set of managed units.

2. The method of claim 1, further comprising:

receiving a memory request from a host system, wherein the memory request includes a logical address;

determining the first segment metadata table entry, corresponding to the first memory segment, in the segment metadata table based on the logical address;

determining a first physical address corresponding to a managed unit in the first set of managed units and based on the logical address, the exchange pointer of the first segment metadata table entry, and a rotation count of the first segment metadata table entry in a segment metadata table, wherein the rotation count indicates a number of times the exchange pointer of the first segment metadata table entry has cycled through the first set of managed units for performance of intra-memory segment wear leveling; and determining whether the first memory segment is involved in an ongoing swap operation with another memory segment in the set of memory components.

3. The method of claim 2, further comprising:

configuring a first migration index of the first segment metadata table entry and a second migration index of a second segment metadata table entry of the segment metadata table, which is associated with the second memory segment, including:
setting the first migration index to indicate a reference to the migration association map entry associated with an ongoing inter-memory segment swap between the first memory segment and the second memory segment, and
setting the second migration index to indicate a reference to the migration association map entry associated with the ongoing inter-memory segment swap between the first memory segment and the second memory segment, and wherein determining whether the first memory segment is involved in an ongoing swap operation includes examining the first migration index.

4. The method of claim 3, further comprising:

determining that the first physical address is greater than or equal to the exchange pointer of the first segment metadata table entry and less than or equal to the exchange pointer of the migration association map entry, wherein the exchange pointer of the first segment metadata table entry references a managed unit in the first set of managed units that is currently unused and wherein the exchange pointer of the migration association map entry references a managed unit in the first set of managed units that was unused at the start of the ongoing swap operation; and fulfilling the memory request using the first physical address in response to determining that the first physical address is not greater than or equal to the exchange pointer of the first segment metadata table entry and less than or equal to the exchange pointer of the migration association map entry.

5. The method of claim 3, further comprising:

determining, in response to determining that the first physical address is not greater than or equal to the exchange pointer of the first segment metadata table entry or not less than or equal to the exchange pointer of the migration association map entry, a second physical address corresponding to a managed unit in the second set of managed units and based on the logical address, a rotation count of the second segment metadata table entry, and the exchange pointer of the second segment metadata table entry, wherein the rotation count of the second segment metadata table entry indicates a number of times the exchange pointer of the second segment metadata table entry has cycled through the second set of managed units for performance of intra-memory segment wear leveling; and fulfilling the memory request using the second physical address.

6. The method of claim 5, wherein copying the first set of managed units to the second set of managed units is complete when the exchange pointer of the migration association map entry is equal to one more than the exchange pointer of the first segment metadata table entry.

7. The method of claim 5, wherein the wear-leveling event is based on one or more of (1) the rotation count in the first segment metadata table entry and (2) a swap threshold associated with the first memory segment, wherein the swap threshold indicates a number of writes or reads before an intra-memory segment swap of managed units from the first set of managed units is performed.

8. A non-transitory computer-readable storage medium comprising instructions that, when executed by a processing device, cause the processing device to:

detect a wear-leveling event in relation to a first memory segment in a set of memory components of the memory subsystem;

add, in response to detection of the wear-leveling event, a migration association map entry to a migration association map to control copying of a first set of managed units from the first memory segment to a second set of managed units of a second memory segment in the set of memory components, wherein adding the migration association map entry includes setting a source address of the migration association map entry to an address of the first memory segment, setting a destination address of the migration association map entry to an address of the second memory segment, and an exchange pointer of the migration association map entry to a value that references an unused managed unit in the first memory segment when the wear-leveling event is detected, wherein the value is retrieved from an exchange pointer of a first segment metadata table entry in a segment metadata table associated with the first memory segment; and copy the first set of managed units from the first memory segment to the second set of managed units of the second memory segment beginning with a managed unit in the first set of managed units following the managed unit referenced by the exchange pointer of the first segment metadata table entry, wherein copying each managed unit in the first set of managed units to the second set of managed units includes incrementing the exchange pointer of the first segment metadata table entry such that the exchange pointer of the first segment metadata table entry references an immediately, previously copied managed unit in the first set of managed units.

9. The non-transitory computer-readable medium of claim 8, wherein the processing device is further to:
receive a memory request from a host system, wherein the memory request includes a logical address;
determine the first segment metadata table entry, corresponding to the first memory segment, in the segment metadata table based on the logical address;
determine a first physical address corresponding to a managed unit in the first set of managed units and based on the logical address, the exchange pointer of the first segment metadata table entry, and a rotation count of the first segment metadata table entry in a segment metadata table, wherein the rotation count indicates a number of times the exchange pointer of the first segment metadata table entry has cycled through the first set of managed units for performance of intra-memory segment wear leveling; and
determine whether the first memory segment is involved in an ongoing swap operation with another memory segment in the set of memory components.

10. The non-transitory computer-readable medium of claim 9, wherein the processing device is further to:
configure a first migration index of the first segment metadata table entry and a second migration index of a second segment metadata table entry of the segment metadata table, which is associated with the second memory segment, including:
setting the first migration index to indicate a reference to the migration association map entry associated with an ongoing inter-memory segment swap between the first memory segment and the second memory segment, and
setting the second migration index to indicate a reference to the migration association map entry associated with the ongoing inter-memory segment swap between the first memory segment and the second memory segment, and
wherein determining whether the first memory segment is involved in an ongoing swap operation includes examining the first migration index.

11. The non-transitory computer-readable medium of claim 10, wherein the processing device is further to:
determine that the first physical address is greater than or equal to the exchange pointer of the first segment metadata table entry and less than or equal to the exchange pointer of the migration association map entry, wherein the exchange pointer of the first segment metadata table entry references a managed unit in the first set of managed units that is currently unused and wherein the exchange pointer of the migration association map entry references a managed unit in the first set of managed units that was unused at the start of the ongoing swap operation; and
fulfill the memory request using the first physical address in response to determining that the first physical address is not greater than or equal to the exchange pointer of the first segment metadata table entry and less than or equal to the exchange pointer of the migration association map entry.

12. The non-transitory computer-readable medium of claim 10, wherein the processing device is further to:
determine, in response to determining that the first physical address is not greater than or equal to the exchange pointer of the first segment metadata table entry or not less than or equal to the exchange pointer of the migration association map entry, a second physical address corresponding to a managed unit in the second set of managed units and based on the logical address, a rotation count of the second segment metadata table entry, and the exchange pointer of the second segment metadata table entry, wherein the rotation count of the second segment metadata table entry indicates a number of times the exchange pointer of the second segment metadata table entry has cycled through the second set of managed units for performance of intra-memory segment wear leveling; and
fulfill the memory request using the second physical address.

13. The non-transitory computer-readable medium of claim 12, wherein copying the first set of managed units to the second set of managed units is complete when the exchange pointer of the migration association map entry is equal to one more than the exchange pointer of the first segment metadata table entry.

14. The non-transitory computer-readable medium of claim 12, wherein the wear-leveling event is based on one or more of (1) the rotation count in the first segment metadata table entry and (2) a swap threshold associated with the first memory segment, wherein the swap threshold indicates a number of writes or reads before an intra-memory segment swap of managed units from the first set of managed units is performed.

15. A system comprising:
a plurality of memory components, including a first memory segment of a first set of managed units and a second memory segment of a second set of managed units; and
a processing device, operatively coupled with the plurality of memory components, to:
add, in response to detection of a wear-leveling event, a migration association map entry to a migration association map to control copying of the first set of managed units from the first memory segment to the second set of managed units of the second memory segment, wherein adding the migration association map entry includes setting an exchange pointer of the migration association map entry to a value that references an unused managed unit in the first memory segment when the wear-leveling event is detected, wherein the value is retrieved from an exchange pointer of a first segment metadata table entry in a segment metadata table associated with the first memory segment; and
copy the first set of managed units from the first memory segment to the second set of managed units of the second memory segment beginning with a managed unit in the first set of managed units following the managed unit referenced by the exchange pointer of the first segment metadata table entry, wherein copying each managed unit in the first set of managed units to the second set of managed units includes incrementing the exchange pointer of the first segment metadata table entry such that the exchange pointer of the first segment metadata table entry references an immediately, previously copied managed unit in the first set of managed units.

16. The system of claim 15, wherein the processing device is further to:
receive a memory request from a host system, wherein the memory request includes a logical address;

determine the first segment metadata table entry, corresponding to the first memory segment, in the segment metadata table based on the logical address;

determine a first physical address corresponding to a managed unit in the first set of managed units and based on the logical address, the exchange pointer of the first segment metadata table entry, and a rotation count of the first segment metadata table entry in a segment metadata table, wherein the rotation count indicates a number of times the exchange pointer of the first segment metadata table entry has cycled through the first set of managed units for performance of intra-memory segment wear leveling; and determine whether the first memory segment is involved in an ongoing swap operation with another memory segment in the plurality of memory components.

17. The system of claim 16, wherein the processing device is further to:

configure a first migration index of the first segment metadata table entry and a second migration index of a second segment metadata table entry of the segment metadata table, which is associated with the second memory segment, including:

setting the first migration index to indicate a reference to the migration association map entry associated with an ongoing inter-memory segment swap between the first memory segment and the second memory segment, and setting the second migration index to indicate a reference to the migration association map entry associated with the ongoing inter-memory segment swap between the first memory segment and the second memory segment, and wherein determining whether the first memory segment is involved in an ongoing swap operation includes examining the first migration index.

18. The system of claim 17, wherein the processing device is further to:

determine that the first physical address is greater than or equal to the exchange pointer of the first segment metadata table entry and less than or equal to the exchange pointer of the migration association map entry, wherein the exchange pointer of the first segment metadata table entry references a managed unit in the first set of managed units that is currently unused and wherein the exchange pointer of the migration association map entry references a managed unit in the first set of managed units that was unused at the start of the ongoing swap operation; and fulfill the memory request using the first physical address in response to determining that the first physical address is not greater than or equal to the exchange pointer of the first segment metadata table entry and less than or equal to the exchange pointer of the migration association map entry.

19. The system of claim 17, wherein the processing device is further to:

determine, in response to determining that the first physical address is not greater than or equal to the exchange pointer of the first segment metadata table entry or not less than or equal to the exchange pointer of the migration association map entry, a second physical address corresponding to a managed unit in the second set of managed units and based on the logical address, a rotation count of the second segment metadata table entry, and the exchange pointer of the second segment metadata table entry, wherein the rotation count of the second segment metadata table entry indicates a number of times the exchange pointer of the second segment metadata table entry has cycled through the second set of managed units for performance of intra-memory segment wear leveling; and fulfill the memory request using the second physical address.

20. The system of claim 19, wherein copying the first set of managed units to the second set of managed units is complete when the exchange pointer of the migration association map entry is equal to one more than the exchange pointer of the first segment metadata table entry, and wherein the wear-leveling event is based on one or more of (1) the rotation count in the first segment metadata table entry and (2) a swap threshold associated with the first memory segment, wherein the swap threshold indicates a number of writes or reads before an intra-memory segment swap of managed units from the first set of managed units is performed.

* * * * *